(12) United States Patent
Ogata et al.

(10) Patent No.: US 7,908,377 B2
(45) Date of Patent: Mar. 15, 2011

(54) COMPUTER SYSTEM AND DATA SHARING METHOD

(75) Inventors: Youko Ogata, Hiratsuka (JP); Hidenori Suzuki, Hadano (JP)

(73) Assignee: Hitachi, Ltd., Toyko (JP)

( * ) Notice: Subject to any disclaimer, the term of this patent is extended or adjusted under 35 U.S.C. 154(b) by 316 days.

(21) Appl. No.: 12/258,579

(22) Filed: Oct. 27, 2008

(65) Prior Publication Data

US 2010/0036932 A1    Feb. 11, 2010

(30) Foreign Application Priority Data

Aug. 6, 2008   (JP) ................................. 2008-202709

(51) Int. Cl.
     *G06F 15/173*     (2006.01)
     *G06F 15/167*     (2006.01)

(52) U.S. Cl. ........................................ 709/226; 709/213

(58) Field of Classification Search .......... 709/212–219, 709/225–229
See application file for complete search history.

(56) References Cited

FOREIGN PATENT DOCUMENTS

| JP | 2005-346426 | 12/2005 |
|----|-------------|---------|
| JP | 2005-352844 | 12/2005 |

*Primary Examiner* — Yasin Barqadle
(74) *Attorney, Agent, or Firm* — Antonelli, Terry, Stout & Kraus, LLP.

(57) ABSTRACT

This invention provides a computer system capable of achieving frequent accesses to the same logical volume by a plurality of computers by using iSCSI. The computer system includes first computers not supporting iSCSI and second computers supporting iSCSI. A load distribution control part determines a requested computer to be requested about a command processing and requests the command processing. The requested computer requests an IO control part about an access to a logical volume in a shared disk. When the requested computer does not support iSCSI, the IO control part selects a substitute computer. The substitute computer mounts the logical volume on behalf of the requested computer to provide the mounted logical volume to the requested computer through NFS.

14 Claims, 22 Drawing Sheets

FIG. 6
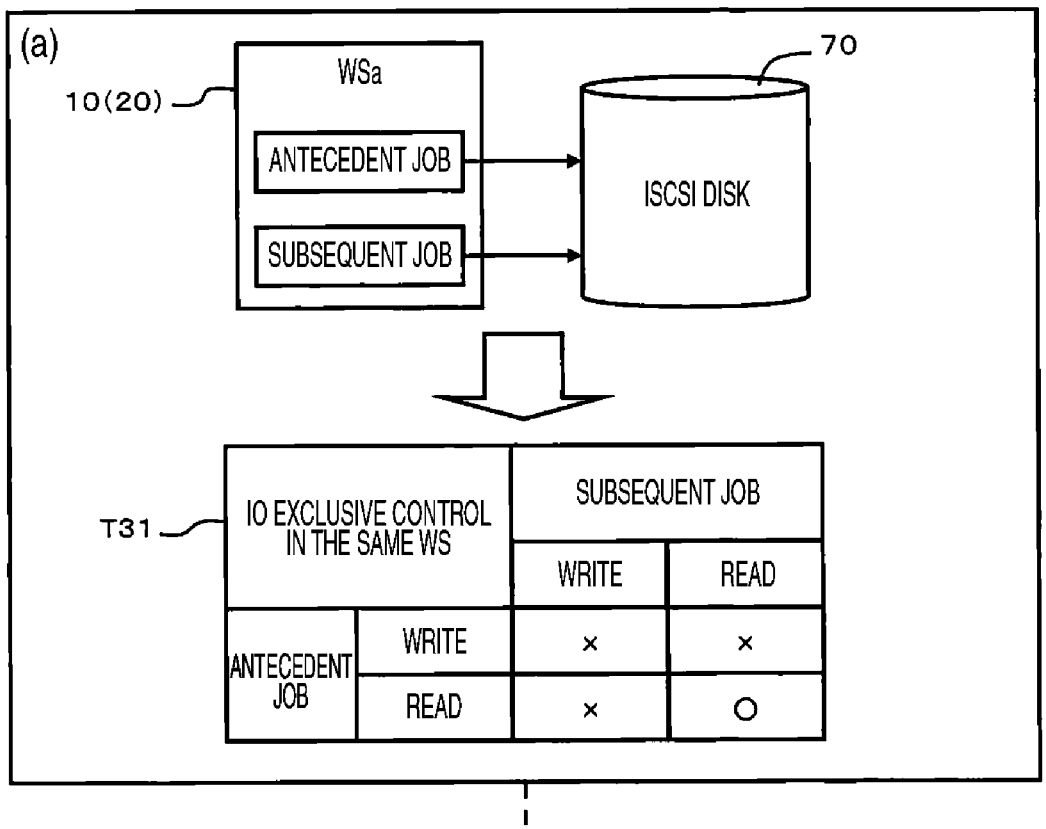
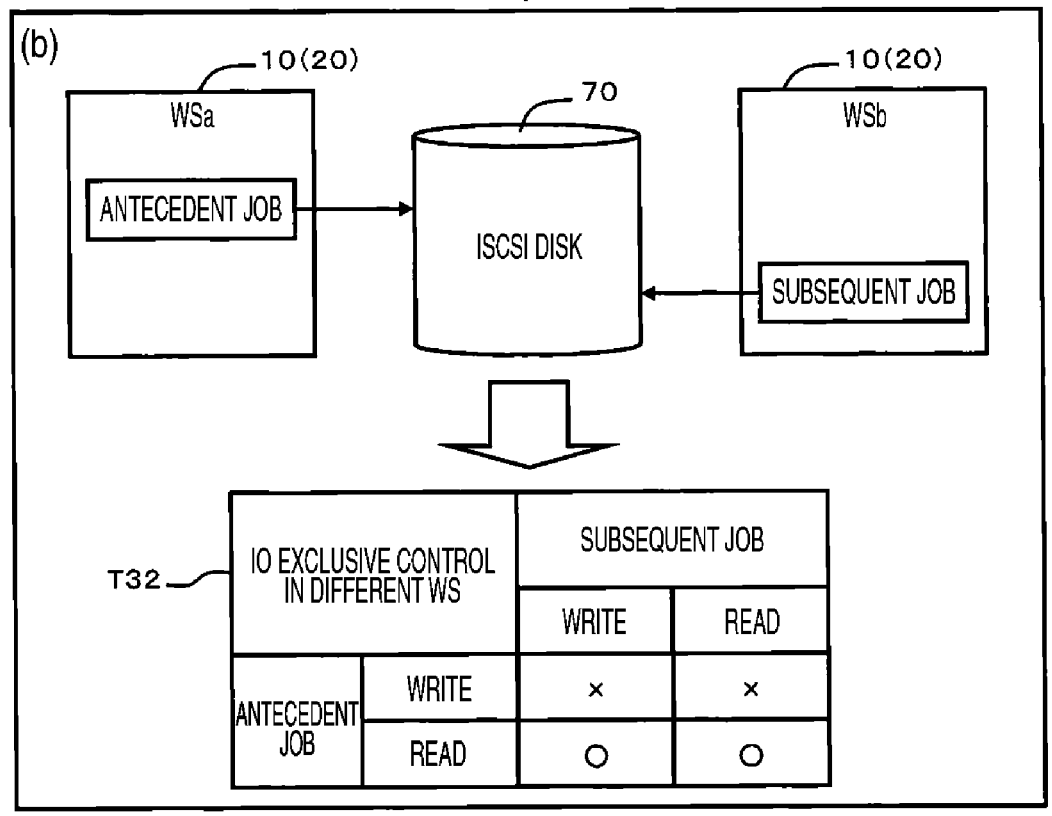

COMPUTER SYSTEM AND DATA SHARING METHOD

CROSS REFERENCES TO RELATED APPLICATIONS

This application relates to and claims priority from Japanese Patent Application No. 2008-202709, filed on Aug. 6, 2008, the entire disclosure of which is incorporated herein by reference.

BACKGROUND OF THE INVENTION

1. Technical Field

The present invention relates to a computer system and data sharing method.

2. Related Art

In recent years, there has been proposed iSCSI (Internet SCSI) capable of using an SCSI (Small Computer System Interface) command by using an IP (Internet Protocol) network. In the iSCSI technique, the SCSI command, data and the like are held in a TCP/IP (Transmission Control Protocol/Internet Protocol) packet and encapsulated. Thereby a storage device according to the iSCSI technique can be directly connected to the communication network and the computer connected to the communication network can read and write data by accessing the storage device (Patent Document 1: JP-A-2005-352844). In this related art, however, the case of using a common logical volume at the same time by a plurality of computers is not considered.

As another related art, which is not the technique related to iSCSI, the technique of using one storage device by a plurality of computers is known (Patent Document 2: JP-A-2005-346426).

When a plurality of computers use one shared storage device located at physically-distant places, an access response time becomes delayed. For example, the following times are to be generated: the communication delay time between each computer and the shared storage device; the waiting time for the completion of the previously-performed processing; the time required for mounting the shared storage device by the computer; and the time required for unmounting the shared storage device by the computer. Accordingly, the response time is to be delayed. In the related art, for this reason, different computers access the same shared storage device frequently and data cannot be shared, which is poor in usability.

In addition, when there are plural computers connected to the shared storage device, the request for command processing is to be concentrated on the computer with the greatest throughput. As a result, a huge backlog is generated to lower the usability.

Further, when the computer supporting iSCSI and the computer not supporting iSCSI exist in the same system, the computer without an iSCSI initiator cannot use the shared storage device based on iSCSI. Therefore, the request for command processing is to be concentrated on the specific computer with the iSCSI initiator and the load on the specific computer is to increase. As a result, a huge backlog is generated.

The invention has been achieved in view of the aforementioned problems, and an object of the invention is to provide a computer system and a data sharing method capable of preventing the increase of backlog and sharing data in the shared storage device by a plurality of computers by using iSCSI. Another object of the invention is to provide a computer system and a data sharing method capable of improving reliability and usability by allowing a direct access to the shared storage device only by the specific computers by using iSCSI. Further object of the invention will be clarified by the description of embodiment mentioned later.

SUMMARY OF THE INVENTION

According to the first aspect of the invention, to solve the aforementioned problems, there is provided a computer system including: at least one shared storage device connected to a communication network and utilized based on iSCSI (internet Small Computer System Interface); a plurality of computers each connected to the shared storage device through the communication network; a load distribution control part that selects one of the computers as a requested computer to be requested about command processing so that a load can be distributed in the computers; and an access request control part that judges an acceptance of an access request issued by the requested computer for the command processing and allows an access to the shared storage device by the requested computer only when the access request is accepted, wherein the access request control part judges the acceptance of a plurality of access requests respectively issued by different and a plurality of the requested computers so that each of the requested computers can use the shared storage device by using iSCSI at the same time.

According to the second aspect, in the first aspect, when an antecedent access request issued first and a subsequent access request issued subsequently are issued from different requested computers the access request control part allows both a read access and a write access with regard to the subsequent access request only in the case of the antecedent access request being the read access while the access request control part prohibits both the read access and the write access with regard to the subsequent access request in the case of the antecedent access request being the write access.

According to the third aspect, in the first or second aspect: a plurality of first computers included in the computers are not provided with an iSCSI initiator to access the shared storage device directly while a plurality of second computers other than the first computers among the computers are provided with the iSCSI initiator, and further the first and second computers are provided with a network file system respectively to share a file system through the communication network; when the requested computer is selected from the first computers by the load distribution control part the access request control part selects a substitute computer from the second computers to access the shared storage device on behalf of the first computer selected as the requested computer; and the first computer selected as the requested computer uses the network file system to utilize data in the shared storage device mounted on the second computer selected as the substitute computer.

According to the fourth aspect, in the third aspect, the access request control part selects the substitute computer so that the load is distributed in the second computers.

According to the fifth aspect, in the third or fourth aspect, the substitute computer can generate an NFS (Network File System) server while the requested computer can generate an NFS client.

According to the sixth aspect, in any one of the first to fifth aspects, the computer to mount the shared storage device among the computers mounts the shared storage device after confirming the shared storage device is unmounted.

According to the seventh aspect, in the sixth aspect, the computer to mount the shared storage device does not mount the shared storage device again when the shared storage device has already been mounted on an own computer.

According to the eighth aspect, in the sixth or seventh aspect, the computer to mount the shared storage device unmounts the shared storage device after the completion of the command processing to notify the access request control part of the unmounting.

According to the ninth aspect, in any one of the first to eighth aspects, the load distribution control part selects one of the computers as the requested computer to be requested about command processing so that a waiting time for the command processing can be the shortest.

According to the tenth aspect of the invention, there is provided a computer system including: at least one shared storage device connected to a communication network based on iSCSI; a plurality of first computers each connected to the shared storage device through the communication network; a plurality of second computers each connected to the shared storage device through the communication network; a load distribution control part that selects one of the computers from the first and second computers as a requested computer to be requested about a processing of command received from a client computer so that a load can be distributed in all computers of the first and second computers; and an access request control part that judges an acceptance of an access request to the shared storage device issued by the requested computer for the processing of command and allows an access to the shared storage device by the requested computer only when the access request is accepted, wherein the first computers can generate an NFS client to utilize the shared storage device through a predetermined second computer from the second computers, wherein the second computers can generate an NFS sever to provide the shared storage device to the NFS client included in a predetermined first computer from the first computers and are provided with an iSCSI initiator to access the shared storage device, and wherein when the predetermined first computer is selected as the requested computer from the first computers the access request control part selects the predetermined second computer as a substitute computer from the second computers and controls the data in the shared storage device to be provided to the NFS client in the predetermined first computer selected as the requested computer through the NFS server in the predetermined second computer selected as the substitute computer.

According to the eleventh aspect, in the tenth aspect, the access request control part selects the substitute computer so that the load is distributed in the second computers.

According to the twelfth aspect, in the tenth or eleventh aspect: when an antecedent access request issued first and a subsequent access request issued subsequently are issued from the same requested computer the access request control part allows only a read access with regard to the subsequent access request; and when the antecedent access request and the subsequent access request are issued from different requested computers the access request control part allows only a read access with regard to the antecedent access request and allows both the read access and the write access with regard to the subsequent access request.

According to the thirteenth aspect of the invention, there is provided a data sharing method including at least one shared storage device utilized based on iSCSI (internet Small Computer System Interface) and a plurality of computers supporting iSCSI and a plurality of computers not supporting iSCSI that are connected to the shared storage device through a communication network respectively and including the steps of: receiving a command; selecting one of the computers as a requested computer to be requested about command processing so that a load can be distributed in the computers; judging whether the requested computer supports iSCSI or not; mounting the shared storage device on the requested computer to perform the command processing and unmounting the shared storage device after the completion of the command processing, when the requested computer supports iSCSI; selecting one of the computers supporting iSCSI as a substitute computer, when the requested computer does not support iSCSI; mounting the shared storage device on the substitute computer; generating an NFS server in the substitute computer and generating an NFS client in the requested computer, and thereby allowing the requested computer to use the shared storage device mounted on the substitute computer; performing the command processing with the use of the shared storage device by the requested computer through the substitute computer and notifying of a processing completion after the completion of command processing; and requesting the substitute computer to unmount the shared storage device and unmounting in response to the request in the case of receiving the processing completion.

At least a part of the configuration in the invention can be generated as a computer program. This computer program can, for example, be fixed to a storage media such as memory and optical disk, or be distributed through communication medium such as communication network.

BRIEF DESCRIPTION OF THE DRAWINGS

FIGS. 6A and 6B are explanatory diagrams showing a method of exclusive control in the case of issuing a plurality of IO requests in the same logical volume.

DETAILED DESCRIPTION OF PREFERRED EMBODIMENTS

Figure 1:
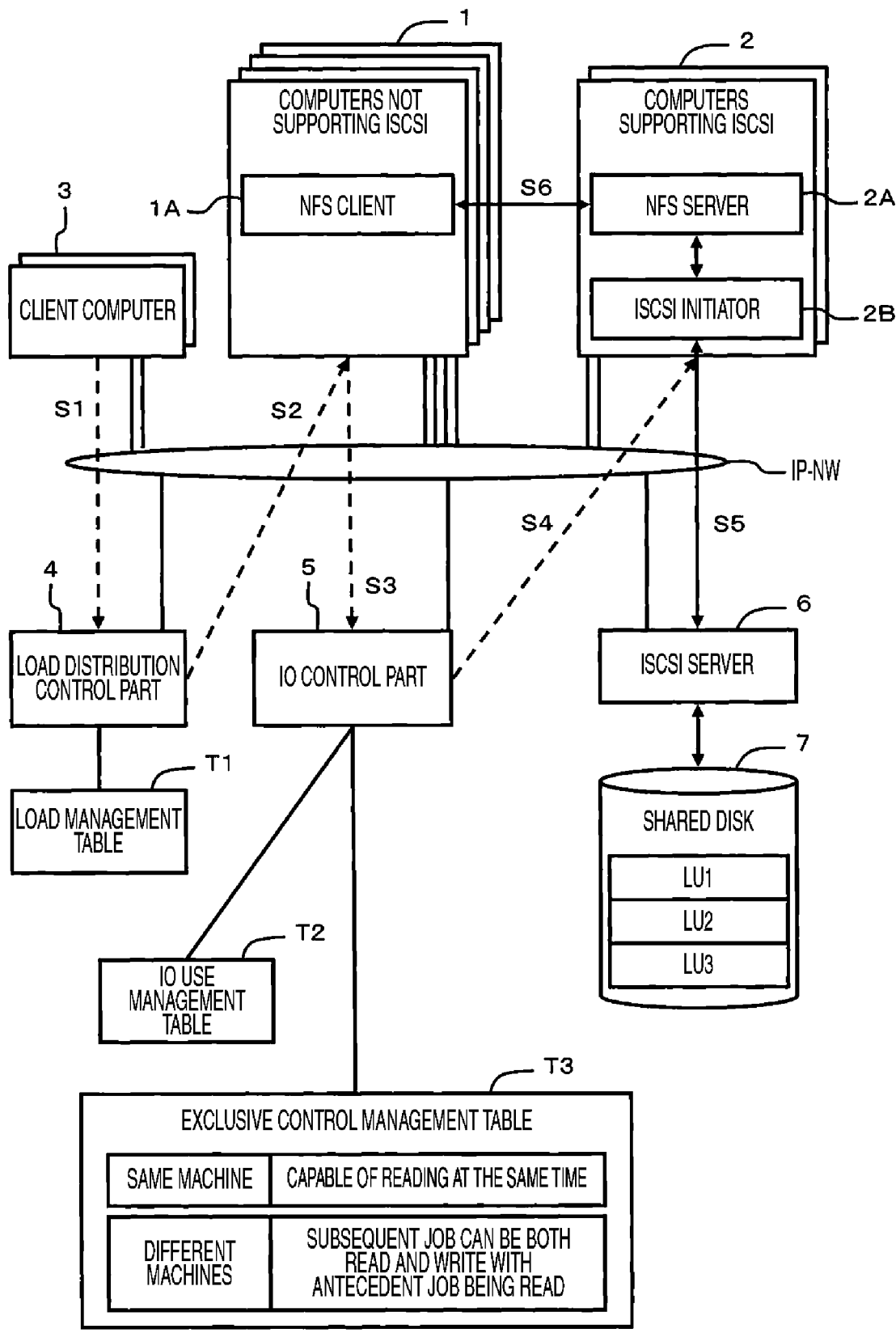
FIG. 1 is a diagram showing a summary of an embodiment of the invention.

Hereinafter, an embodiment of the invention will be described in reference to attached drawings. FIG. 1 is an explanatory diagram showing the whole of this embodiment. In this embodiment, a plurality of computers 1, 2 can use a shared disk 7 at the same time. Also in this embodiment, iSCSI is exemplified as a communication protocol for a plurality of computers distributed on a communication network to use in common a shared storage device directly connected to a communication network. The invention, however, is not restricted to iSCSI and will be able to be applied to other communication protocols capable of connecting a storage device directly to a wide area communication network such as the Internet. FIG. 1 also shows the summary of the invention to the extent required for understanding and carrying out the invention. The scope of this embodiment is not restricted to the configuration in FIG. 1 and the details of this embodiment will be clarified by the following embodiment.

A computer system according to this embodiment is configured by: first computers 1 not supporting iSCSI; second computers 2 supporting iSCSI; a client computer 3; a load distribution control part 4; an IO control part 5; an iSCSI server 6 including an iSCSI target; and the shared disk 7, each of which will be described later.

Each of the computers 1, 2, the load distribution control part 4, the IO control part 5 and the iSCSI server 6 are connected to each other through a communication network IP-NW so as to be capable of interconnecting to each other. The communication network IP-NW is configured as, for example, a communication network capable of using TCP/IP (Transmission Control Protocol/Internet Protocol) such as the Internet.

Although each of the computers 1, 2, the iSCSI server 6 and the shared disk 7 can be provided in physically-separated places, the invention is not restricted to this example and each of the computers 1, 2, the iSCSI server 6 and the shared disk 7 may be located adjacently to each other. In addition, although each of the computers 1, 2, is configured as a computer such as workstation, the invention is not restricted to a workstation and the load distribution control part 4 and the IO control part 5 may be configured as separate computers (server computers) or may be provided in one computer (server computer).

The computer system includes the plurality of first computers 1 not supporting iSCSI and the plurality of second computers 2 supporting iSCSI. "Supporting iSCSI" means being provided with an iSCSI initiator while "not supporting iSCSI" means not being provided with an iSCSI initiator.

In this embodiment, the first computers 1 not supporting iSCSI exist more than the second computers 2 supporting iSCSI. In other words, comparatively small numbers of second computers 2 supporting iSCSI help the utilization of the shared disk 7 by comparatively large number of first computers 1 not supporting iSCSI. Thereby it is not necessary to set ports to allow communications on a fire wall beyond necessity to improve the reliability of the computer system. In addition, since it is not necessary to load the iSCSI initiator on all computers in the computer system, the initial cost and maintenance cost for the computer system can be reduced.

The iSCSI initiator may be realized by any of hardware products and software products. Even the computers 1 not supporting iSCSI presently can be provided with the function of the iSCSI initiator by placing hardware of the iSCSI initiator thereon. Or, the computers 1 without the iSCSI initiator can be provided with the function as the iSCSI initiator by running the software of iSCSI initiator.

Both the first computers 1 and the second computers 2 can share data by using NFS (Network File System). When the first computers 1 not supporting iSCSI use the data in the shared disk 7, the second computers 2 supporting iSCSI mount the shared disk 7 on behalf of the first computers 1, which will be described later. Then the first computers 1 access the data in the shared disk 7 mounted on the second computers 2, by using NFS. For this, the first computers 1 are provided with an NFS client 1A while the second computers 2 are provided with an NFS server 2A and an iSCSI initiator 2B.

The client computer 3 is configured as, for example, a computer such as a personal computer and uses the computers 1, 2.

The load distribution control part 4 distributes a load in the computers 1, 2 in the computer system to prevent the load from concentrating on a specific computer. The load distribution control part 4 determines a requested computer to process a command issued by the client computer 3, based on a load management table T1. The load management table T1 manages the load status or the computational capacity with regard to the computers 1, 2 in the computer system.

The IO (Input/Output) control part 5 corresponds to an access request control part, manages the access request (IO request) to the shared disk 7 centrally, and judges the allowance of the IO request (access request) issued by the requested computer, by using an IO use management table T2 and an exclusive control management table T3. The IO use management table T2 manages, for example, which computer performs an access, what kind of access (read access or write access) is performed with regard to the logical volume in the shared disk 7 and which logical volume the access is performed on. In other words, the IO use management table T2 manages the state of IO request to the shared disk 7.

The exclusive control management table T3 manages the condition where accesses compete to the same logical volume against each other. In the exclusive control management table T3, there are set in advance both the case where a plurality of IO requests about the same logical volume are issued from the same computer and the case where a plurality of IO requests are issued from different computers. In the following description, a plurality of IO requests about the same logical volume will be called an antecedent IO request and a subsequent IO request distinctly in some cases. The antecedent IO request is the IO request issued first while the subsequent IO request is the IO request after the antecedent IO request.

When the antecedent IO request and the subsequent IO request about the same logical volume are issued from the same computer, a concurrent access to the logical volume is allowed only in the case of the antecedent IO request and the subsequent IO request being read accesses respectively. In other words, the antecedent read access and the subsequent read access are performed at the same time and all other combinations are prohibited. When the antecedent IO request is the write access, the subsequent IO request to the logical volume on which the write access is performed is prohibited. In addition, when the antecedent IO request is the read access, the subsequent write access to the logical volume on which the read access is performed is prohibited.

When the antecedent IO request and the subsequent IO request about the same logical volume are issued from different computers, the subsequent IO request is prohibited only in the case of the antecedent IO request being the write access. When the antecedent IO request is the read access, both the read access and the write access are allowed with regard to the subsequent IO request. In other words, when different computers use the same logical volume at the same time, both the subsequent read access and the subsequent write access are allowed in the case of the antecedent IO request being the read access. The reason for this is that when the antecedent IO request is the read access the data read by the antecedent read access is not influenced at all even with the allowance of the subsequent write access.

The IO control part 5 judges the acceptance of a plurality of access requests about the same logical volume. Further when the IO control part 5 receives the IO request to the shared disk 7 from the first computers 1 not supporting iSCSI, the IO control part 5 selects one of the second computers 2 to mount the shared disk 7 on behalf of the first computers 1 as a substitute computer. The substitute computer provides the first computers 1 with the mounted data in the shared disk 7 through NFS. Thereby the first computers 1 can use the data in the shared disk to perform a necessary processing such as read processing or write processing.

The iSCSI server 6 is provided with an iSCSI target and has the shared disk 7 connected. It is not necessary for the iSCSI server 6 and the shared disk 7 to be configured separately and the iSCSI server may be provided in a disk device.

The shared disk 7 is a rewritable nonvolatile storage device such as hard disk drive, optical disk drive, phase change memory device (PRAM: Phase change RAM) and flash memory device. In this embodiment, the type of storage device is not specified. Although the storage device will be called a disk as a matter of convenience, the storage medium does not have to be formed in a disk-shape.

Using a physical storage area in the shared disk 7 forms a logical volume as a logical storage device. The physical storage areas in a plurality of storage devices are virtualized as a parity group, in which one or more logical volumes can be provided. Or, one or more logical volumes can be provided in a physical storage area in one storage device as well. The logical volume stores the data on the file and so on used in common by the computers 1, 2. In the Figure, the logical volume is abbreviated as LU.

The flow of operation in this embodiment will be described. The load distribution control part 4 selects one of the computers to be requested about command processing based on the load management table T1 (S2) after receiving a command from the client computer 3 (S1). The load distribution control part 4 selects one of the computers 1, 2 in the computer system irrespective of supporting iSCSI. Consequently, as shown in FIG. 1, one of the first computers 1 without the iSCSI initiator may be selected as the requested computer.

One of the first computers 1 selected as the requested computer (hereafter, referred to as requested computer 1 as required) requests the IO control part 5 about the access to the shared disk 7 (S3). The IO control part 5 manages the access to the shared disk 7 in the computer system centrally and grasps the computers 2 supporting the iSCSI, which will be described later.

When there is the access request from the requested computer 1 not supporting iSCSI to the shared disk 7 (S3), the substitute computer to mount the shared disk 7 on behalf of the requested computer 1 is selected from the computers 2 supporting iSCSI (S4). One of the computers 2 selected as the substitute computer (hereafter, referred to as substitute computer 2 as required) is notified from the IO control part 5 of the information to specify the requested computer 1 such as IP address and the information to specify the storage area (logical volume) that the requested computer 1 desires to access such as access path information.

The substitute computer 2 issues the command by using the iSCSI initiator 2B to mount the desired logical volume in the shared disk 7 on the substitute computer 2 (S5). Then the substitute computer 2 creates the NFS server 2A to provide the logical volume mounted on the substitute computer 2 to the requested computer 1 through NFS (S6). The requested computer 1 accesses the logical volume in the shared disk 7 from the NFS client 1A through the NFS server 2A.

In this embodiment as described above, a plurality of computers 1, 2 can access the same logical volume in the shared disk 7 to use data.

In this embodiment, when a plurality of IO requests about the same logical volume are issued from different computers, both of the cases of the subsequent IO request being a read request and a write request are allowed as long as the antecedent IO request is the read request. In other words, when the read access is previously performed about the logical volume in the shared disk 7, both the write access and the read access can be performed thereafter for the logical volume. Therefore, the chance of using the same logical volume in the shared disk 7 by the plurality of computers in the computer system at the same time increases to reduce a backlog and to improve usability.

In this embodiment, one of the computers 1, 2 is selected as the requested computer so that a load can be distributed in the computers and the requested computer receives the request about the command processing. Therefore, the requested computer is determined according to the load status in the computers 1, 2 to reduce the backlog.

Also in this embodiment, the computers 1 not supporting iSCSI can use the data in the desired logical volume through the computers 2 supporting iSCSI and NFS under the system environment where the computers 1 not supporting iSCSI and the computers 2 supporting iSCSI exist at the same time. Consequently, it is not necessary to provide an iSCSI initiator function in all computers in the computer system to reduce the construction cost and maintenance cost in the system. In addition, limiting the number of the computers 2 supporting iSCSI makes it possible to limit the configuration number of ports passing through the fire wall to improve security.

In this embodiment, the substitute computer is selected so that a load can be distributed in one of the second computers 2 supporting iSCSI. In other words, a specific second computer 2 is selected as the substitute computer to prevent a high-load status and to reduce the backlog. Hereafter, this embodiment will be described in detail.

First Embodiment

Figure 2:
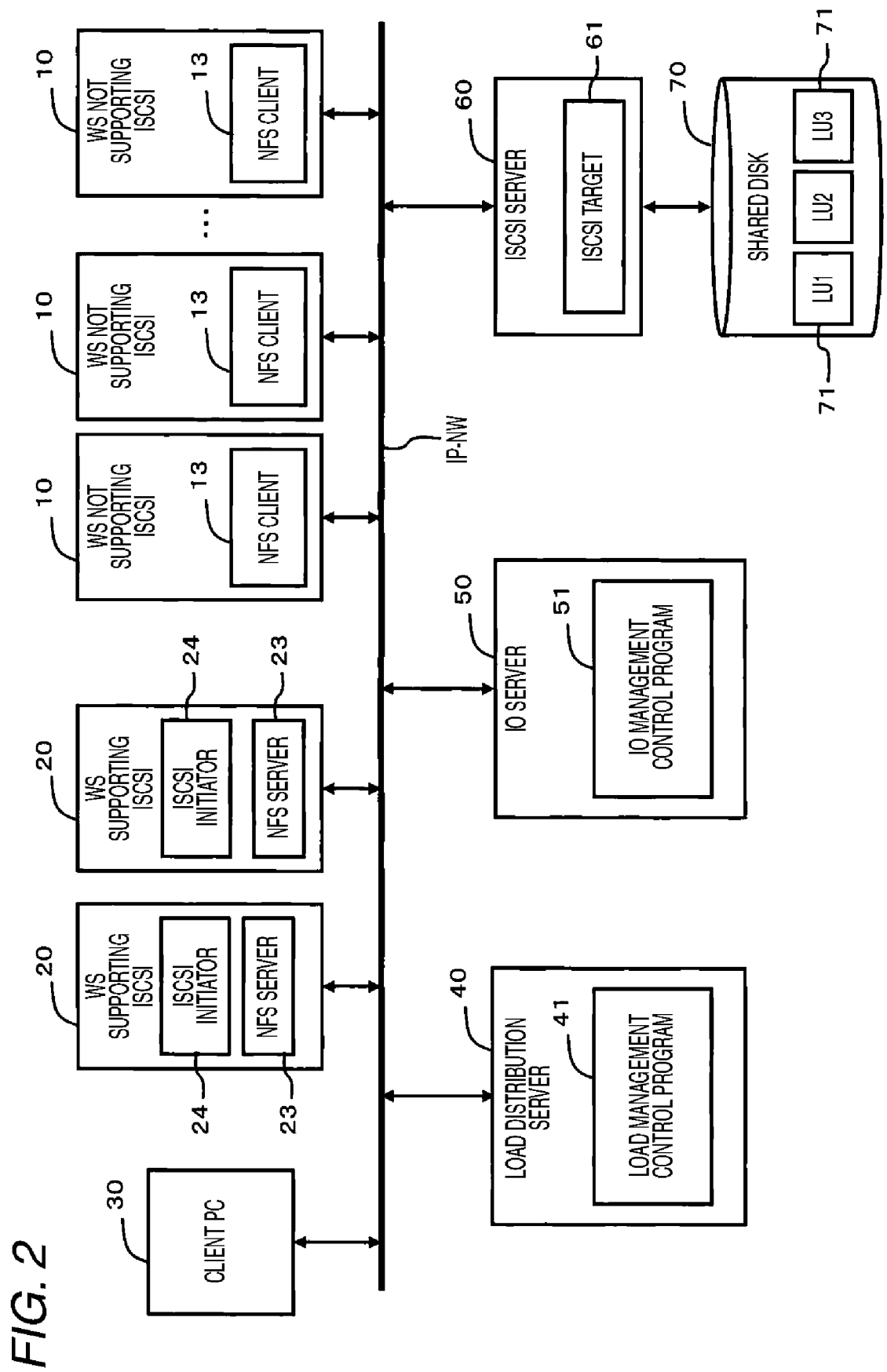
FIG. 2 is a diagram showing a whole configuration of a computer system.

FIG. 2 is an explanatory diagram showing the whole configuration of the computer system according to this embodiment. First of all, the correspondence relation to FIG. 1 will be described. A first computer 10 corresponds to the first computer 1 in FIG. 1; a second computer 20 to the second computer 2; a client computer 30 to the client computer 3; a load distribution server 40 to the load distribution control part 4; an IO server 50 to the IO control part 5; an iSCSI server 60 to the iSCSI server 6; and a shared disk 70 to the shared disk 7.

The computer system is configured by, for example: the first computers 10; the second computers 20; at least one client computer (hereafter, referred to as client PC) 30; at least one load distribution server 40; at least one IO server 50; at least one iSCSI server 60; and at least one shared disk 70.

Each of the computers 10, 20, the client PC 30 and each of the servers 40, 50, 60 are connected to each other through a communication network IP-NW so as to be capable of interconnecting to each other. The computers 10, 20, the client PC 30 and each of the servers 40, 50, 60 can be provided in physically-separated places or in the same enclosure.

Here, the computers 10, 20, the client PC 30 and each of the servers 40, 50, 60 are configured as a computer device respectively. Therefore, these computer devices 10-60 include, for example, CPU (Central Processing Unit), RAM (Random Access Memory), ROM (Read Only Memory), network interface, local disk and the like.

The shared disk 70 is connected to the iSCSI server 60, which is provided with an iSCSI target 61 and operates the shared disk 70 in accordance with the command issued from an iSCSI initiator in the second computer 20. The shared disk 70 is provided with one or more logical volumes 71.

Figure 3:
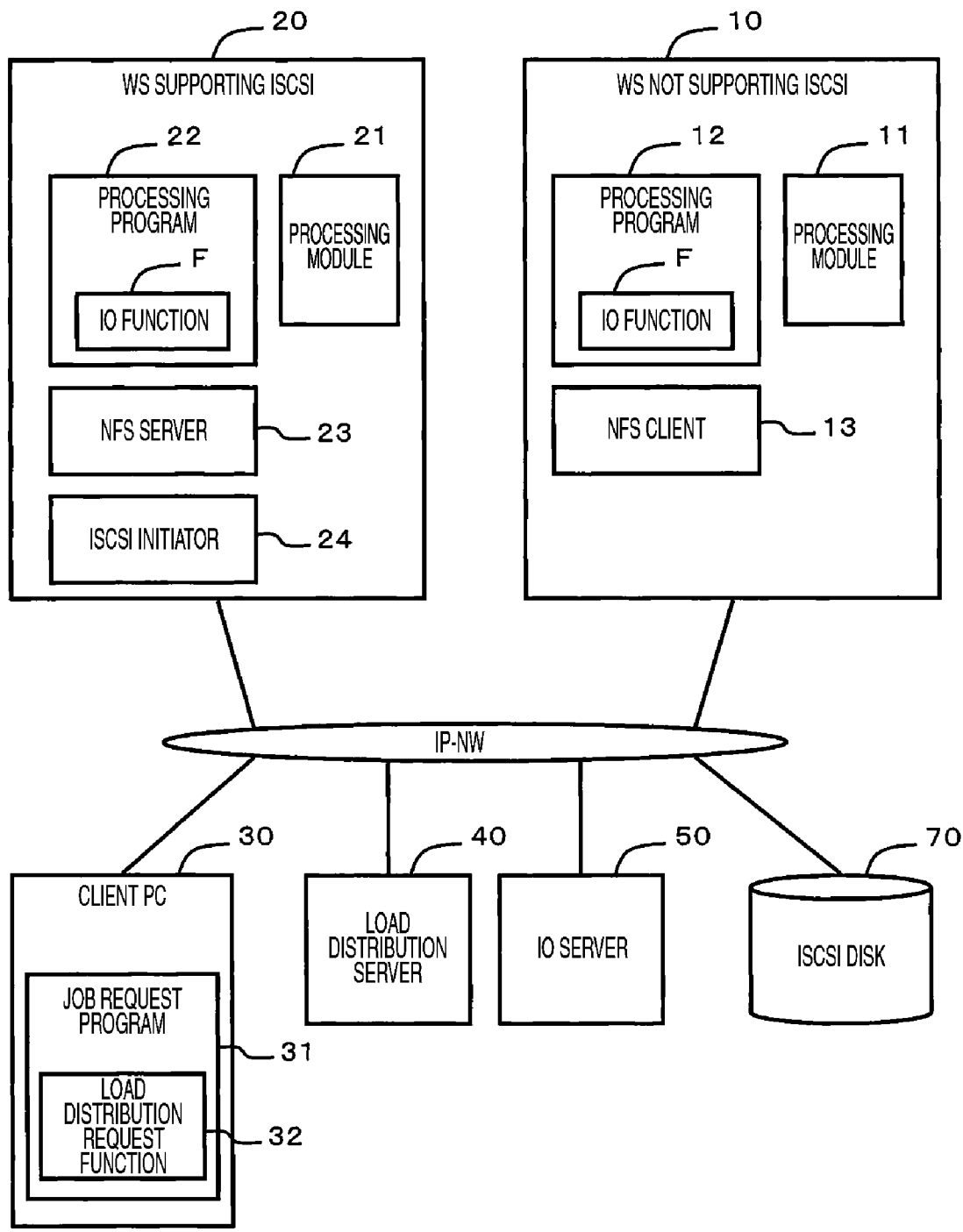
FIG. 3 is an explanatory diagram showing configurations of computers supporting iSCSI and not supporting iSCSI.

FIG. 3 is an explanatory diagram showing the configurations of the computers 10, 20 and the client PC 30. In the following drawings, the iSCSI server 60 will be omitted and the shared disk 70 will be indicated as iSCSI disk 70 so as to clarify the supporting of iSCSI by the shared disk 70.

The computers 10, 20 are configured as computer devices such as workstation. Consequently, an indication "WS" is given to the computers 10, 20 in Figure. The computers 10, 20, however, are not restricted to a workstation and may be configured as other computer device such as server computer. The first computers 10 not supporting iSCSI include, for example, a processing module 11, a processing program 12 and an NFS client 13.

The processing module 11 accepts a processing request from the load distribution server 40 to take the request over to the processing program 12, which is configured by various application programs such as compilation program and simulation program. The processing program 12 performs a predetermined processing by calling an IO function prepared in advance according to this embodiment. The IO function F includes, for example, a read command and a write command.

The NFS client 13 is used to access the logical volumes 71 in the shared disk 70 through the second computers 20 supporting iSCSI and accesses the data in the logical volumes 71 through an NFS server 23 in the second computers 20.

The second computer 20 supporting iSCSI include, for example, a processing module 21, a processing program 22, an NFS server 23 and an iSCSI initiator 24. The processing module 21 accepts the request from the load distribution server 40 and the IO server 50. The processing program 22 is configured by various application programs and performs a predetermined processing by calling the IO function F.

The NFS server 23 provides the NFS client 13 in the first computers 10 with the logical volumes 71 mounted on the second computers 20, through NFS.

The iSCSI initiator 24 uses the logical volumes in the shared disk 70 through the iSCSI target. The iSCSI initiator 24 can be configured as a hardware circuit or a software product. In the case of configuring as a hardware circuit, an iSCSI target device (shared disk 70) can be used without the increase of load of CPU on the second computers 20. In the case of installing the iSCSI initiator 24 as a software product on the second computers 20, the iSCSI initiator 24 can be realized more easily. In the case of realizing the iSCSI initiator 24 by software, however, the CPU load on the second computers 20 increases according to the performance of the second computers 20 and it may take a longer time to process the command from the client PC 30.

The client PC 30 is configured as, for example, a computer device such as personal computer, personal digital assistance or a mobile phone and provided with a job request program 31 to use the processing programs 12, 22. The job request program 31 can use a load distribution request function 32, which is a function to request the load distribution server 40 to distribute the load of the command processing.

Figure 4:
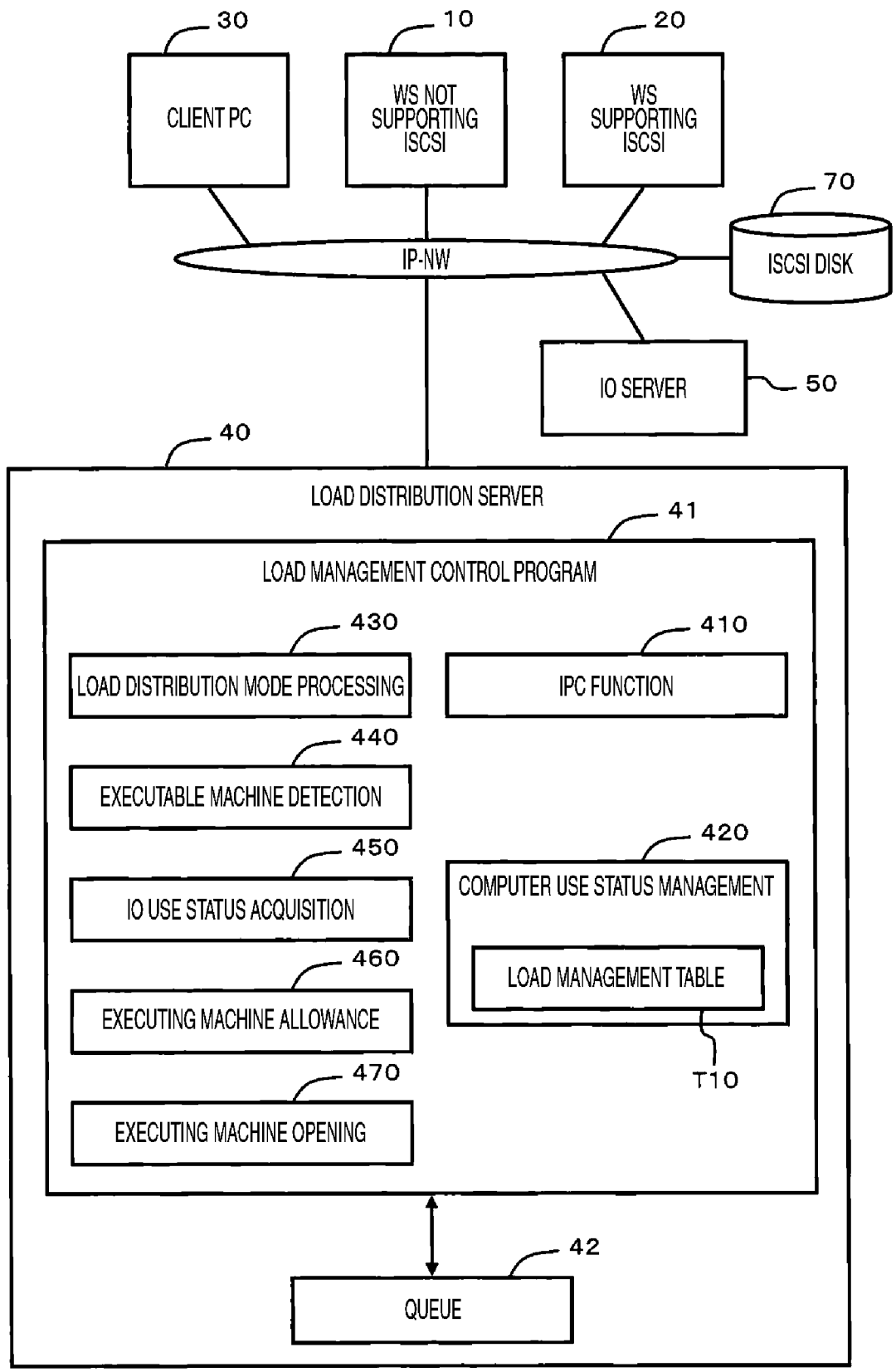
FIG. 4 is an explanatory diagram showing a configuration of a load distribution server.

FIG. 4 is an explanatory diagram showing a configuration of the load distribution server 40. The load distribution server 40 includes a load management control program 41 and a queue 42. The load management control program 41 controls the load to be distributed in the computers 10, 20 to prevent the load from concentrating on a specific computer. With this program 41, the requested computer to process the command received from the client PC 30 is selected so as to distribute the load in the computers 10, 20. The queue 42 manages the command waiting for the selection of requested computer.

The load management control program 41 includes as the internal function thereof, for example: an IPC function 410; a computer use status management 420; a load distribution mode processing 430; an executable machine detection 440; an IO use status acquisition 450; an executing machine allowance 460; and an executing machine opening 470.

The IPC function 410 performs communication with an IPC function 510 in an IO server 50. The computer use status management 420 uses a load management table T10 described later to manage the use statuses (load statuses) of the computers 10, 20 in the computer system.

The load distribution mode processing 430 selects the requested computer from the computers 10, 20 based on the load statuses of the computers 10, 20 to prevent a specific computer from being intensively selected as the requested computer. The executable machine detection 440 detects the computer (machine) capable of executing the command processing from the computers 10, 20 in the computer system. In other words, the computer having the processing program responding to the request from the client PC 30 is detected.

The IO use status acquisition 450 acquires the use status of the shared disk 70 (which computer uses the logical volume, which logical volume is used, and so on) from an IO management control program 51 in the IO server 50. The executing machine allowance 460 allows the computer (machine) selected as the requested computer to execute the request (command) from the client PC 30. The executing machine opening 470 opens the computer selected as the requested computer.

Figure 5:
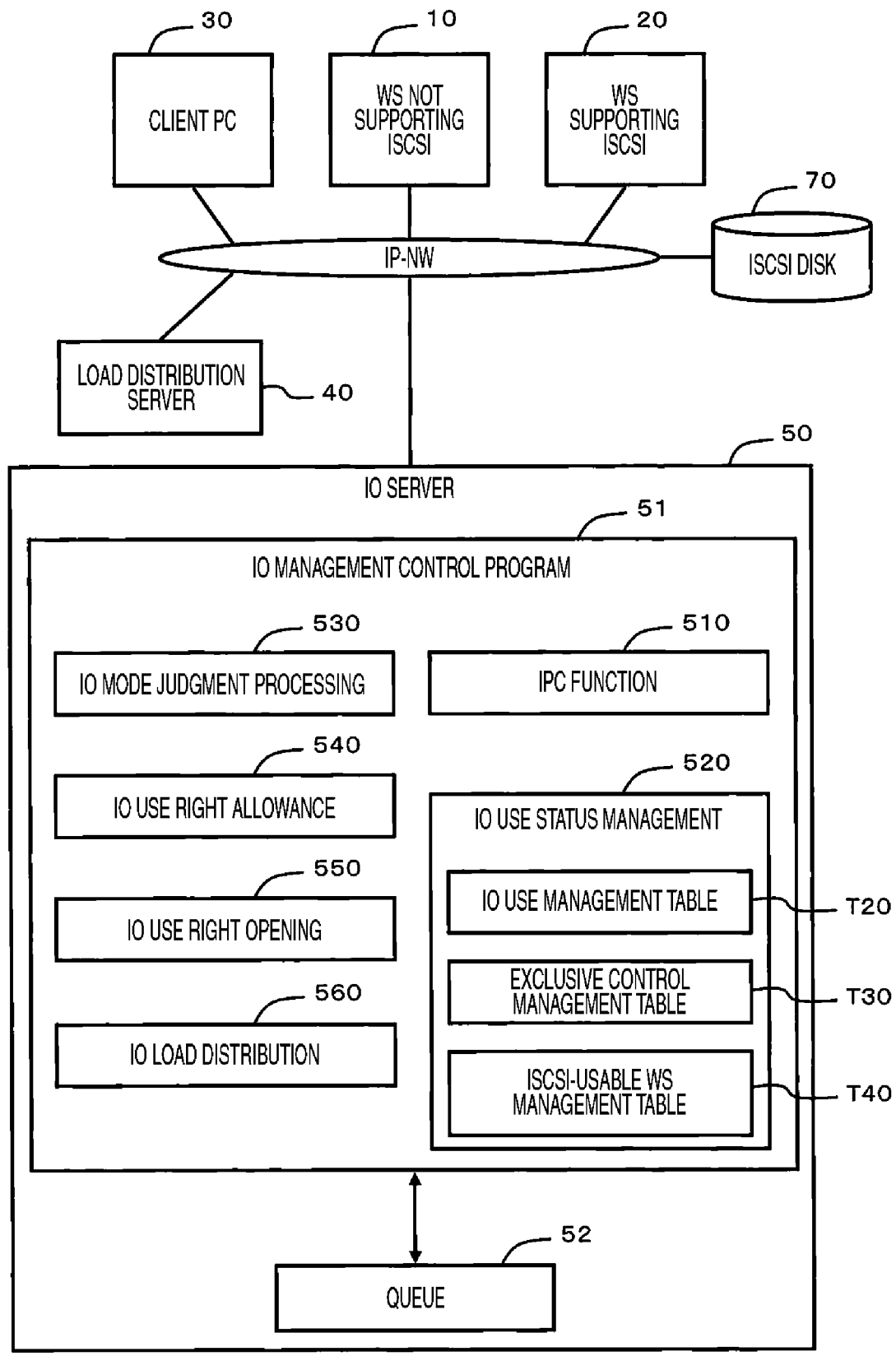
FIG. 5 is an explanatory diagram showing a configuration of an IO server.

FIG. 5 is an explanatory diagram showing the configuration of the IO server 50. The IO server 50 includes the IO management control program 51 and a queue 52. The IO management control program 51 manages the access status to the shared disk 70. The queue 52 manages the command waiting for the use of the shared disk 70.

The IO management control program 51 includes, for example: the IPC function 510; an IO use status management 520; an IO mode judgment processing 530; an IO use right allowance 540; an IO use right opening 550; and an IO load distribution 560.

The IPC function 510 performs communication between the load management control program 41 of the load distribution server 40 and the IO management control program 51. The IO use status management 520 uses an IO use management table T20, an exclusive control management table T30 and an iSCSI-usable computer management table T40 to manage the status of IO request to each of the logical volumes 71 in the shared disk 70.

The IO use management table T20 manages the IO request to use the logical volumes 71 in the shared disk 70. The exclusive control management table T30 manages the condition about whether the exclusive control is performed or not with regard to a plurality of IO requests using the same logical volume 71. The iSCSI-usable computer management table T40 manages an identifier of the computer including the iSCSI initiator.

The IO mode judgment processing 530 judges the execution of the exclusive control based on the type of IO request (write request or read request) from the requested computer, an identification number of the logical volume 71 of the destination of the IO request, and so on. The IO use right allowance 540 allows the use of the logical volumes 71 in the shared disk 70 in response to the IO request from the requested computer. The IO use right opening 550 opens the use allowance of the logical volumes 71 in response to the IO request. The IO load distribution 560 selects the substitute computer to prevent the load increase due to the selection of the specific second computer 20 as the substitute computer, considering the load on the second computers 20.

FIGS. 6A and 6B are explanatory diagrams showing the exclusive control of the IO request. FIG. 6A shows the case of issuing a plurality of IO requests (jobs) from the same computer while FIG. 6B shows the case of issuing a plurality of IO requests from different computers.

Here, the requested computer to execute the process requested by the client PC 30 is selected according to the load status in all the computers 10, 20 in the computer system. Therefore in FIG. 6, a numeral 10(20) is attached to the computers so as to indicate the first computer 10 or the second computer 20.

There will be described the case of issuing a plurality of (two) IO requests from the same requested computer WSa in reference to FIG. 6A. A table T31 to manage the IO exclusive control in the same computer in the exclusive control management table T30 allows the subsequent IO request only in the case of both the antecedent IO request and the subsequent IO request being the read request, while there are prohibited in other cases. In other words, when the antecedent IO request is the write request, all subsequent IO requests are prohibited irrespective of read request or write request. When the antecedent IO request is the read request, the subsequent read request is allowed but the subsequent write request is prohibited.

There will be described the case of issuing a plurality of IO requests from different computers WSa and WSb in reference to FIG. 6B. In this Figure, the antecedent IO request is issued from one computer WSa while the subsequent IO request is issued from another computer WSb. A table T32 to manage the IO exclusive control in different computers in the exclusive control management table T30 allows the subsequent IO request whether the subsequent IO request is the read request or the write request in the case of the antecedent IO request being the read request, while when the antecedent IO request is the write request all subsequent IO requests are prohibited irrespective of read request or write request.

Figure 7:
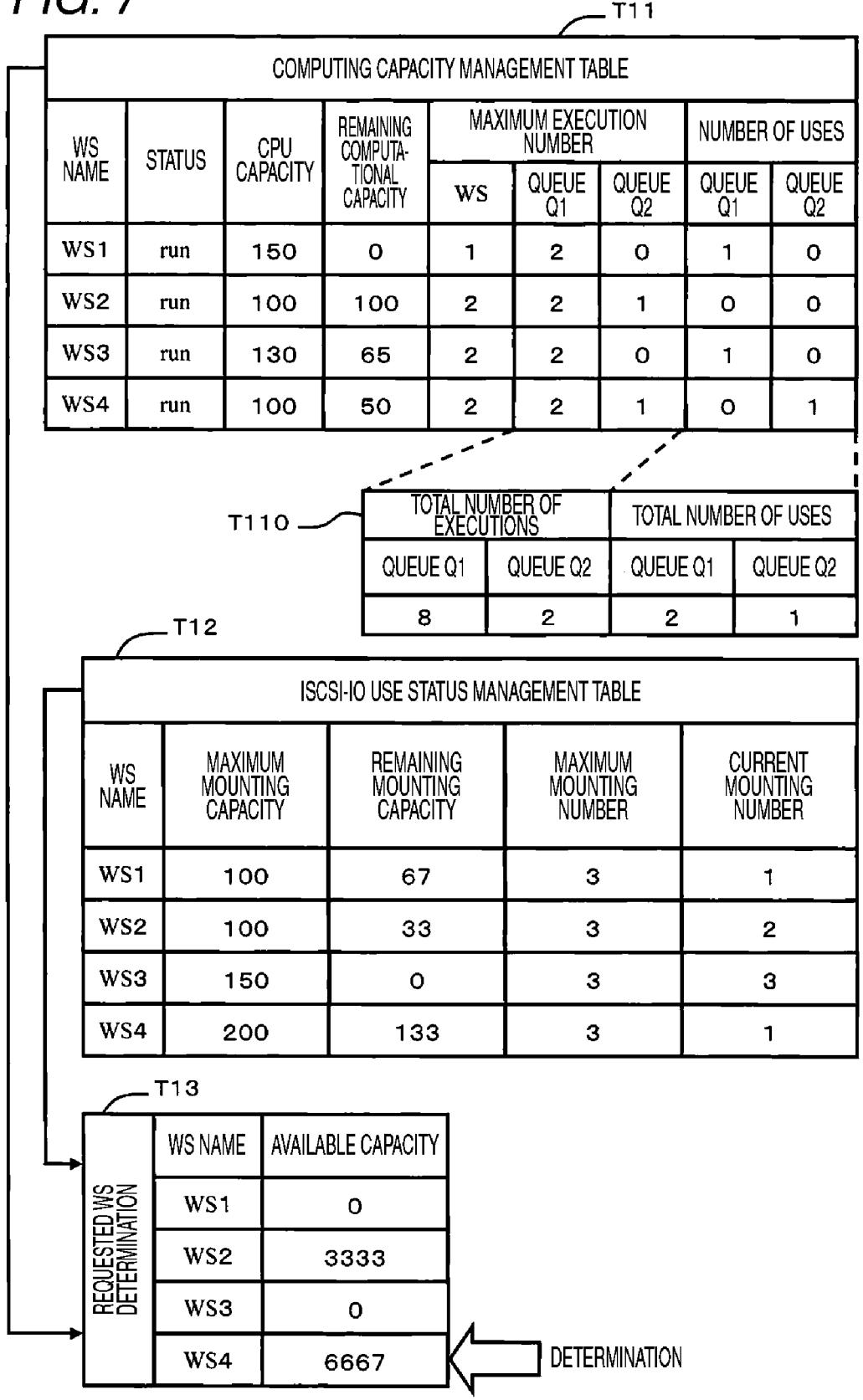
FIG. 7 is an explanatory diagram showing a selection of a requested computer to be requested about a command processing among computers in the computer system.

FIG. 7 is an explanatory diagram showing the configurations of tables T11-T13 configuring the load management table T10. A computing capacity management table T11 manages throughput and so on in the computers 10, 20 in the computer system. The computing capacity management table T11 manages, for example, WS name, status, CPU capacity, remaining computational capacity, maximum execution number, number of uses and so on.

The WS name is the name discriminating between the computers 10, 20. The status indicates whether each of the computers is during operation or not. During normal operation, there is set as, for example, "run" as the item of status. The CPU capacity indicates the CPU capacity (computational capacity) of the computers. The value calculated based on, for example, the type of CPU in the computer, the number of CPUs, the drive frequency of CPU or the like is set at the item of CPU capacity. The value has no unit of quantity and indicates the high throughput as the value is larger.

The remaining computational capacity indicates an unused computational capacity in all computational capacities (CPU capacities) in the computer. The remaining computational capacity is calculated by, for example, the following expression:

$$\text{Remaining computational capacity} = \text{CPU capacity} \times (\text{maximum execution number of the computer} - \text{number of uses})/\text{maximum execution number of the computer}.$$

The maximum execution number indicates the number of jobs (WS) executable in the computers. Each queue Q1, Q2 is prepared for each processing program and manages the job waiting for the processing in the processing program. The number of uses indicates the currently-executed job.

Focusing on, for example, the computer WS1 in the first line of the management table T11, the CPU capacity thereof is "100", the maximum execution number of jobs is "1" and the number of uses is "1". Accordingly, the remaining computational capacity is "0" (remaining computational capacity=100×(1−1)/1=0). Focusing on the computer WS3 in the third line of the management table T11, the CPU capacity thereof is "130", the maximum execution number of jobs is "2" and the number of uses is "1". Accordingly, the remaining computational capacity is "65" (remaining computational capacity=130×(2−1)/2=65).

A management table T110 manages the total number of the jobs executable in the computer system and the number of the actually-executed jobs. Thereby the aggregate throughput of the computer system and the actually-used throughput can be managed for each of processing programs in the computer system.

Figure 21:
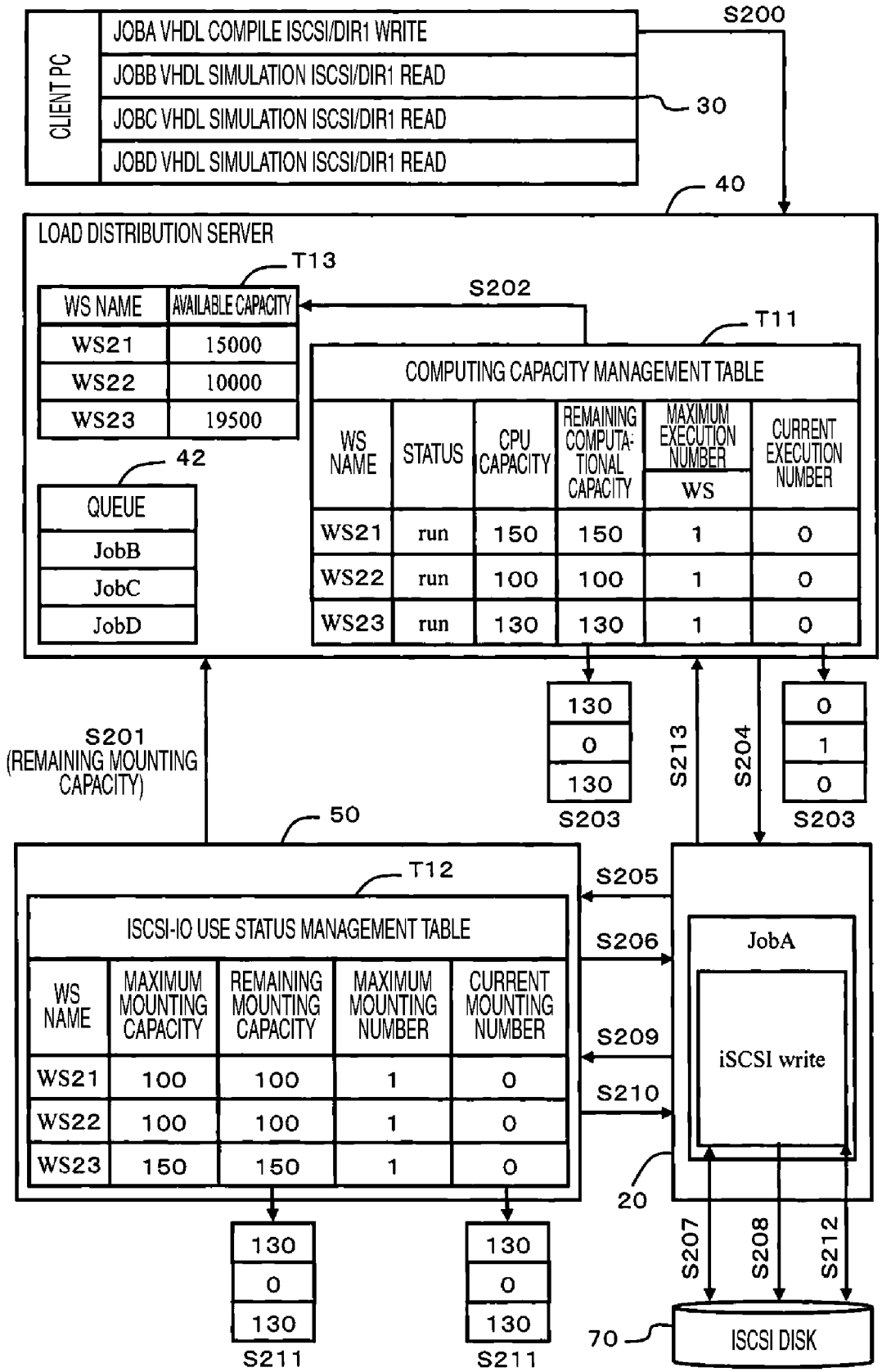
FIG. 21 is an explanatory diagram showing a configuration and an operation of a computer system according to a second embodiment.

An iSCSI-IO use status management table T12 manages the status of IO request to the logical volumes 71 in the shared disk 70. This management table T12 is generated based on the information acquired from the IO use management table T20 of the IO server 50. Note that, as shown in FIG. 21 described later, the iSCSI-IO use status management table T12 may be managed in the IO server 50. In other words, there may be managed not as a part of the load management table T10 but as a part of the IO use management table T20.

The iSCSI-IO use status management table T12 manages, for example, WS name, maximum mounting capacity, remaining mounting capacity, maximum mounting number, current mounting number and so on. The WS name is the name discriminating between the computers 10, 20. The maximum mounting capacity is the value with no unit indicating the mounting performance of the computer. For example, the value calculated based on the communication rate between the computer and the shared disk 70, the transfer rate inside the computer or the like is set as the item of the maximum mounting capacity.

The remaining mounting capacity indicates an unused mounting capacity in the maximum mounting capacity in the computer. The remaining mounting capacity is calculated by, for example, the following expression:

Remaining mounting capacity=maximum mounting capacity×(maximum mounting number−current mounting number)/maximum mounting number.

The maximum mounting number indicates the maximum number of the logical volumes that can be mounted on the computer. The current mounting number indicates the number of the logical volumes mounted on the computer.

A requested computer determination table T13 is temporarily created to determine the computer to be requested (requested computer) about the processing requested from the client PC 30. This determination table T13 includes two items, WS name and available capacity.

The WS name is the name discriminating between the computers 10, 20. The available capacity indicates the degree of available capacity (allowance) for the computer to accept a new job. The available capacity is calculated by the following expression:

Available capacity=remaining computational capacity×remaining mounting capacity.

The computers are selected as the requested computer sequentially from the computer with the largest available capacity. In FIG. 7, the computer WS4, whose available capacity is the largest, is selected as the requested computer. Thereby the available capacity of the computer WS4 decreases.

In this embodiment as described above, the available capacity is calculated from the allowance of the computational capacity (remaining computational capacity) of the computer and the allowance of the mounting capacity (remaining mounting capacity) of the computer to determine the requested computer based on the available capacity. Note that the above-mentioned determining method of the requested computer is one preferable example and other methods can be used.

Figure 8:
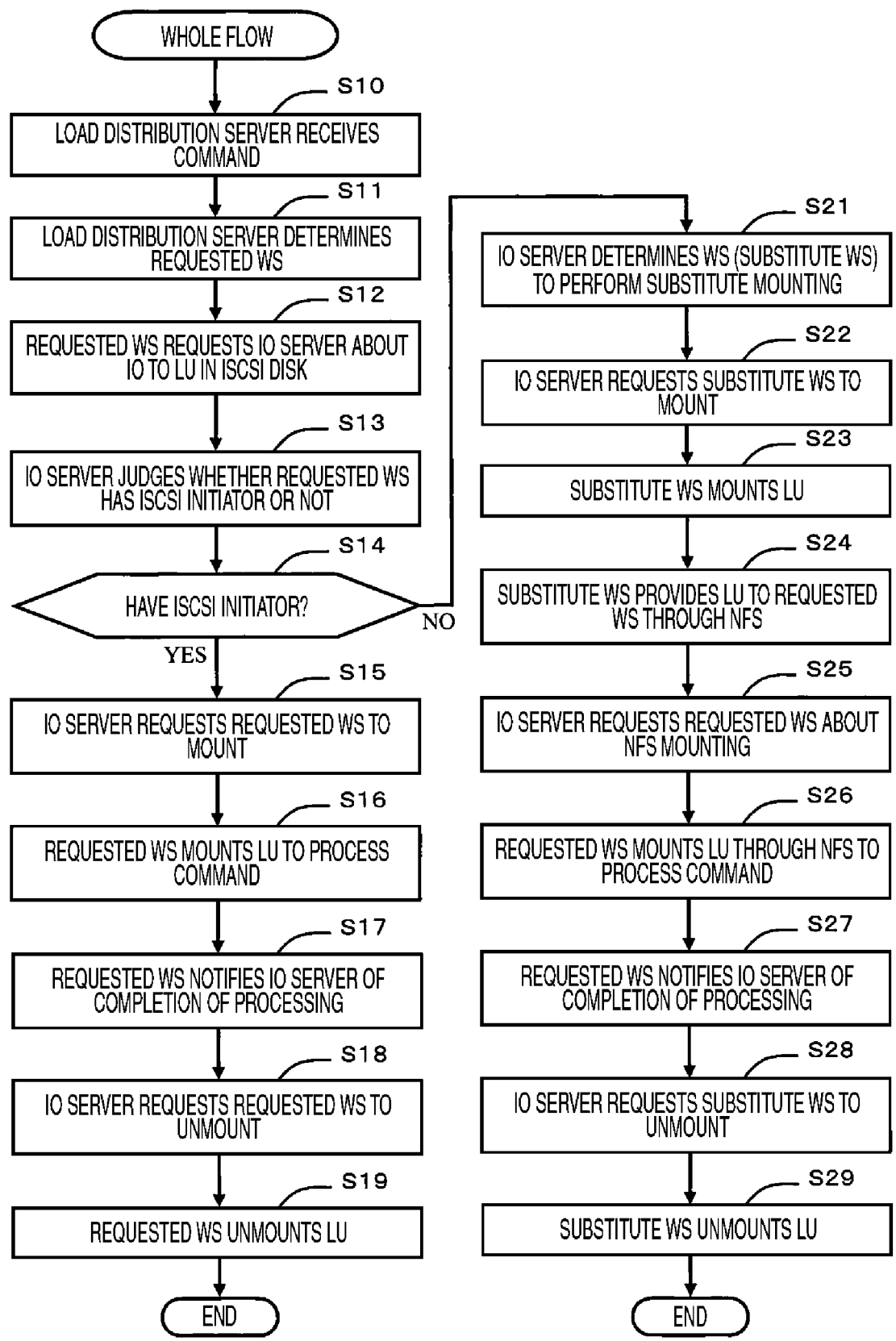
FIG. 8 is a flowchart showing an entire flow of process according to this embodiment.

FIG. 8 is a flowchart showing the whole operation of the computer system and the detailed flow thereof will be further described. The following flowchart indicates the summary of respective processings to the extent required for understanding and carrying out the invention and may be different from an actual computer system. In addition, what we call a person skilled in the art can carry out modification or deletion of the illustrated steps or addition of a new step.

First of all, the load distribution server 40 receives a command from the client PC 30 (S10). The load distribution server 40 selects the computer with the largest available capacity in the computers 10, 20 as the requested computer to request the requested computer about the command processing requested from the client PC 30 (S11), based on the method described in FIG. 7.

The requested computer requests the IO server 50 about the IO (access) to the logical volumes 71 in the shared disk 70 (S12). The IO server 50 uses the iSCSI-usable computer management table T40 to judge whether the requested computer has the iSCSI initiator or not (S13).

When the requested computer has the iSCSI initiator (S14: YES), i.e., when one of the second computers 20 is selected as the requested computer, the IO server 50 requests the requested computer about mounting of the logical volumes 71 (S15).

The requested computer mounts the predetermined logical volume 71 in the shared disk 70 in accordance with the request from the IO server 50 to execute the predetermined processing (S16). The predetermined logical volume is, for example, the logical volume storing the data required to execute the processing requested from the client PC 30.

When the requested computer completes the execution of the processing program, the requested computer notifies the IO server 50 of the completion of IO processing (S17). After receiving the notification of completion from the requested computer, the IO server 50 requests the requested computer to unmount the logical volume 71 (S18). The requested computer unmounts the logical volume 71 in accordance with the request from the IO server 50 (S19). In addition, after the completion of unmounting, the requested computer notifies the IO server 50 of the completion of unmounting, which is not shown in Figure.

When the requested computer does not have the iSCSI initiator (S14: NO), i.e., when one of the first computers is selected as the requested computer, the IO server 50 selects the substitute computer to mount the logical volume 71 on behalf of the requested computer (S21). The IO server 50 selects, for example, the computer with the lightest load in the second computers 20 in the computer system as the substitute computer based on the IO use management table T20.

The IO use management table T20 manages which logical volume is used by the computers and which computer uses the logical volume. Accordingly, using the IO use management table T20 makes it possible to judge which computer is the computer 20 with the highest load executing a plurality of jobs and which computer is the computer 20 with the lightest load not executing a job.

The IO server 50 notifies the second computer 20 selected as the substitute computer of, for example, the name and IP address of the requested computer, the access path to the logical volume 71 to be mounted and so on (S21).

The IO server 50 requests the substitute computer to mount the predetermined logical volume 71 (S22). The substitute computer mounts the specified logical volume 71 in response to the request from the IO server 50 (S23).

Then the substitute computer generates the NFS server 23 to make preparations for providing the data in the logical volume 71 to the requested computer through NFS (S24). The IO server 50 requests the requested computer about NFS mounting after receiving the report on the completion of mounting of the logical volume 71 from the substitute computer (S25).

The NFS mounting in this embodiment means making the data on the logical volume 71 mounted on the substitute computer available by logging in the NFS server 23 in the substitute computer through the NFS client 13.

The requested computer mounts the logical volume 71 through NFS in accordance with the request from the IO server 50 to execute the predetermined processing (S26). Then the requested computer notifies the IO server 50 of the completion of processing after the completion of the processing (S27).

The IO server 50 requests the substitute computer to unmount the logical volume 71 after confirming the completion of processing in the requested computer (S28). Thereby the substitute computer unmounts the logical volume 71 to notify the IO server 50 of the completion of unmounting (S29).

Figure 9:
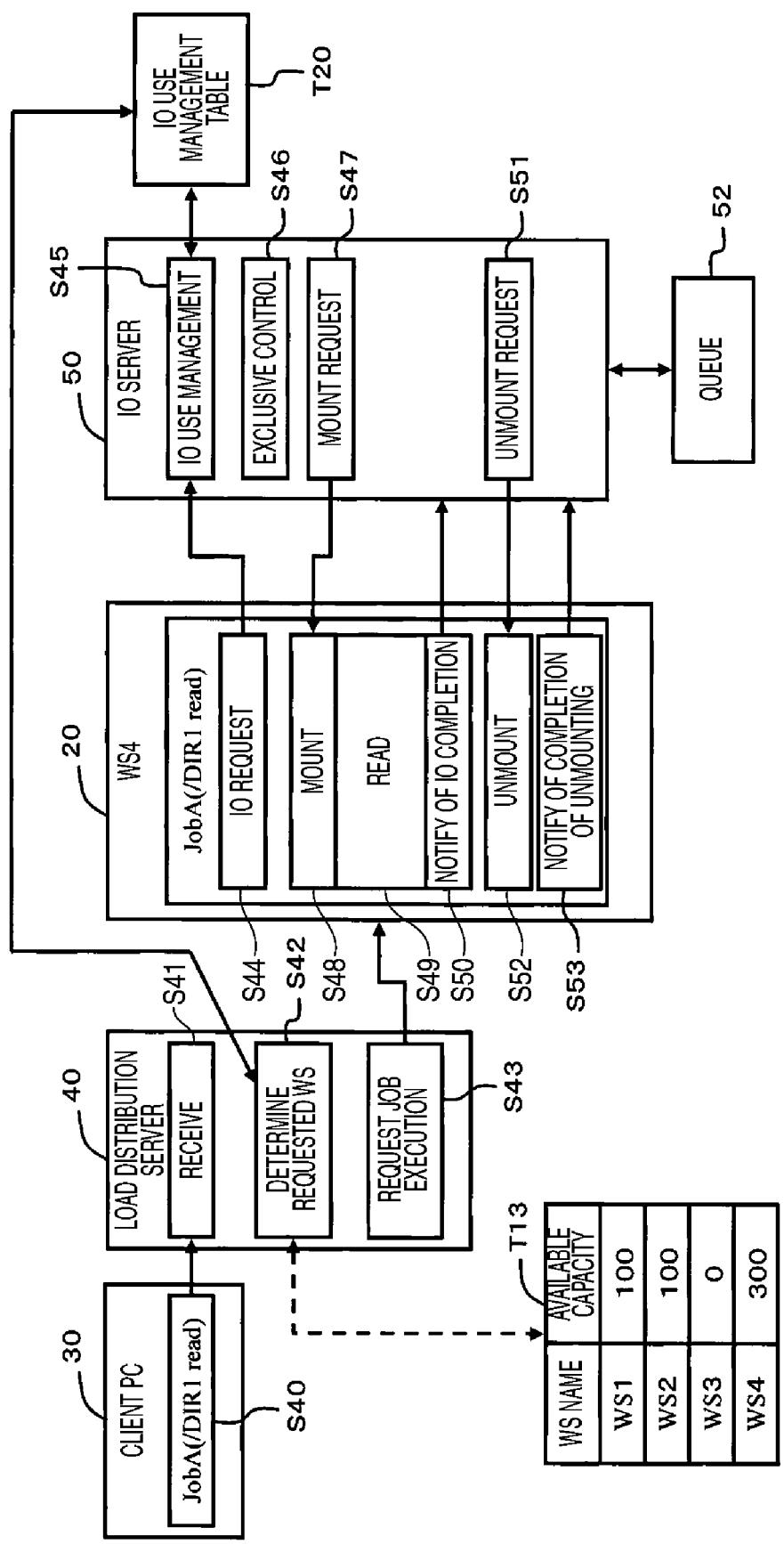
FIG. 9 is an explanatory diagram showing a flow of execution processing of one read request.

FIG. 9 is an explanatory diagram showing the flow of execution of one read request. In other words, FIG. 9 shows S10-S19 in FIG. 8 in another expression form. The client PC 30 issues a command such as "JobA/DIR1 read" (S40). This command means requesting about reading the data in the area specified by "DIR1" from the logical volume 71.

After receiving the command from the client PC 30 (S41), the load distribution server 40 determines one requested computer by using the tables T11-T13 as shown in FIG. 7 (S42). The load distribution server 40 requests the requested computer to process the command "JobA/DIR1 read" (S43). In FIG. 9, it is assumed that one of the second computers 20 supporting iSCSI is selected as the requested computer.

The requested computer 20 requests the IO server 50 to access the predetermined logical volume 71 (S44). The IO server 50 uses the IO use management table T20 to judge the allowance of the access to the logical volume 71 by the requested computer 20 (S45, S46). The IO exclusive control has been described in FIG. 6. When there is no reason for prohibiting the access to the logical volume 71 by the requested computer 20, the IO server 50 requests the requested computer 20 to mount the logical volume (S47).

The requested computer 20 mounts the logical volume 71 in response to the request from the IO server 50 (S48) to read the data from the specified location (S49). After the completion of read processing, the requested computer 20 notifies the IO server 50 of the completion (S50).

When the IO server 50 receives the IO completion notification from the requested computer 20, the IO server 50 requests the requested computer 20 about unmounting (S51). The requested computer 20 unmounts the logical volume 71 in response to the request from the IO server 50 (S52) to notify the IO server 50 of the completion of unmounting (S53).

Figure 10:
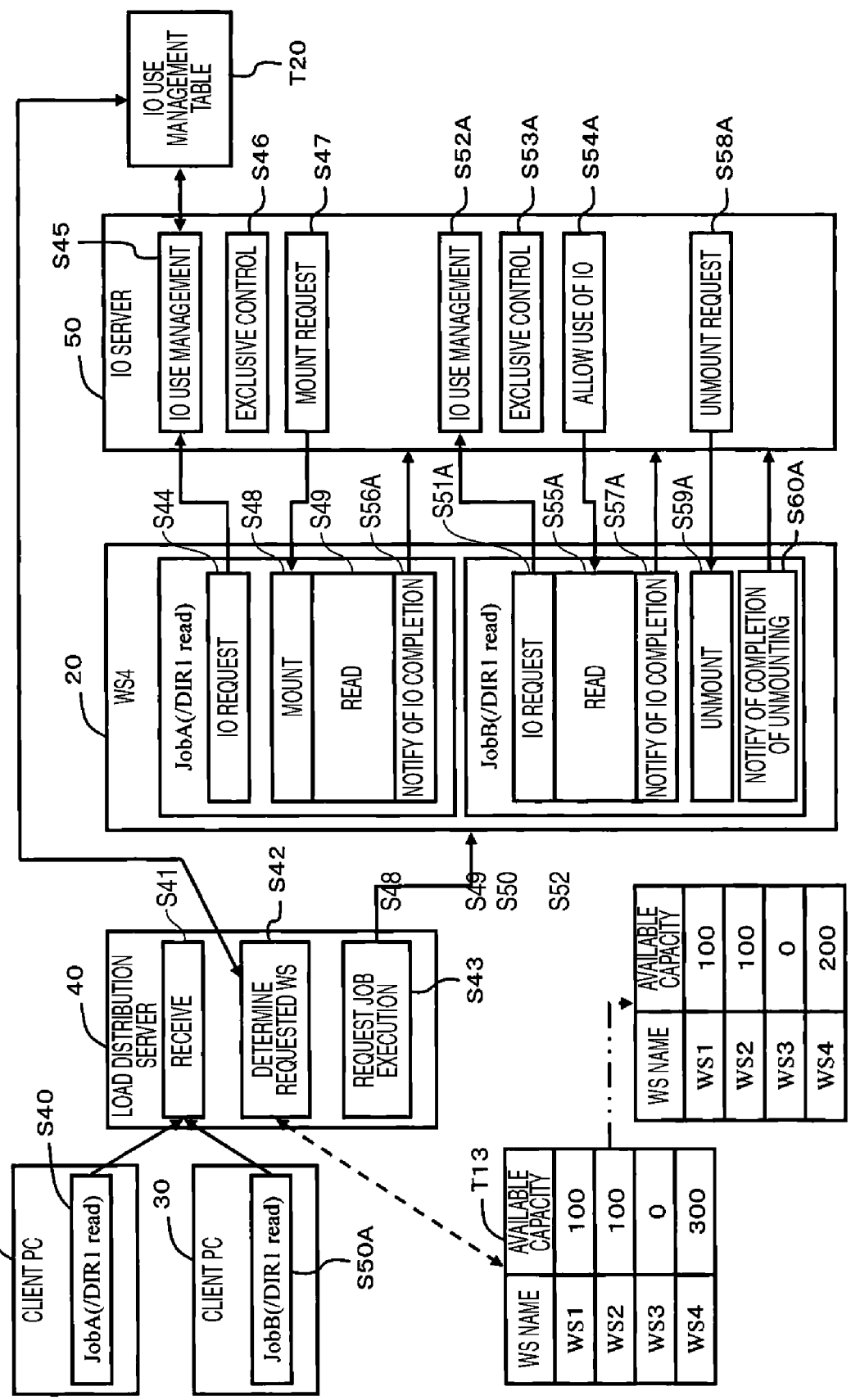
FIG. 10 is an explanatory diagram showing a flow of execution processing of a plurality of read requests.

FIG. 10 shows the case of requesting the same computer 20 about the processing of command using the same logical volume 71. When the client PC 30 issues a antecedent command "JobA/DIR1 read" (S40), the load distribution server 40 accepts the antecedent command (S41) to determine the requested computer 20 (S42) and to request the requested computer 20 to process the command (S43).

When the requested computer 20 requests the IO server 50 to access the logical volume 71 (S44), the IO server 50 requests the requested computer 20 to mount the logical volume 71 (S47), considering conditions on the use status of the logical volume 71 and exclusive control (S45, S46). Thereby the requested computer 20 mounts the logical volume 71 (S48) to read the data (S49).

During the processing of the antecedent command by the requested computer 20, another client PC 30 issues a subsequent command "JobB/DIR1 read" (S50A) targeting the same logical volume 71.

Similarly to the antecedent command, the load distribution server 40 accepts the subsequent command (S41) to determine the requested computer 20 (S42) and to request the requested computer 20 to process the subsequent command (S43). As shown in the table T13 in FIG. 10, the second computer 20 "WS4", which has a large available capacity value "300", is selected to be requested about the processing of the antecedent command. Thereby although the available capacity value of the second computer 20 "WS4" decreases to "200", this value is still larger than the available capacity values of other computers WS1, WS2, WS3. Therefore, the second computer 20 "WS4" is selected to be requested about the processing of the subsequent command as well.

The requested computer 20 requests the IO server 50 to access the logical volume 71 so as to process the subsequent command (S51A). The IO server 50 judges the allowance of the use of the logical volume 71 based on the IO use management table T20 and the exclusive control management table T30 (S52A, S53A) to allow the use of the logical volume 71 for the processing of the subsequent command (S54A). In FIG. 10, since both the antecedent IO request and the subsequent IO request are the read request, the use of the logical volume 71 in response to the subsequent IO request is allowed.

The requested computer 20 reads the data from the logical volume 71 (S55A) to notify the IO server 50 of the completion of data reading (S57A). In the meantime, the antecedent command processing is completed, of which is notified the IO server 50 (S56A). After confirming the completion of processing on the subsequent command (subsequent IO request), the IO server 50 requests the requested computer 20 to unmount the logical volume 71 (S58A).

The requested computer 20 unmounts the logical volume 71 in response to the request from the IO server 50 (S59A) to notify the IO server 50 of the completion of unmounting (S60A).

Figure 11:
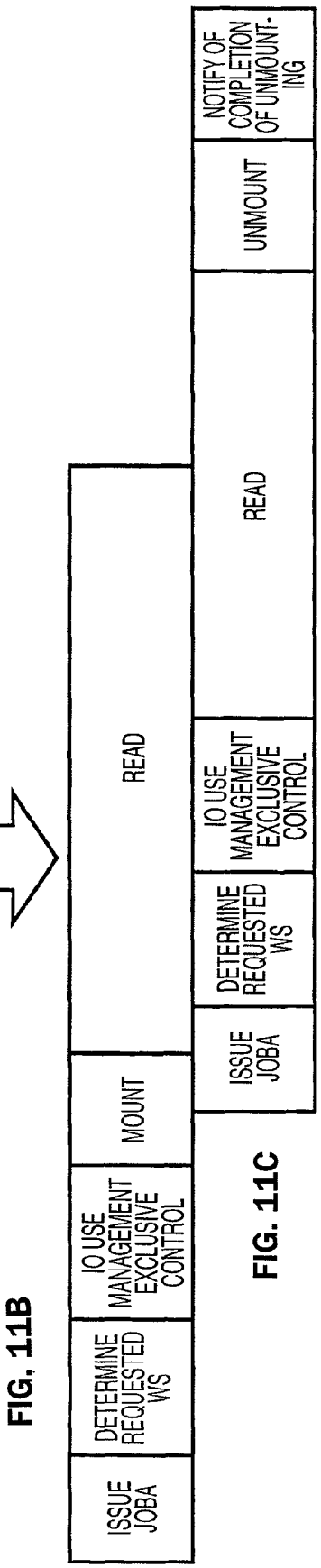
FIGS. 11A, 11B and 11C show a schematic timing chart of the execution processing of the read request.

FIGS. 11A, 11B and 11C show a timing chart of the processings in FIGS. 9 and 10. FIG. 11A corresponds to FIG. 9 while FIGS. 11B and 11C correspond to FIG. 10. In FIG. 11, a part of steps is extracted for convenience.

FIG. 11B shows the antecedent command processing while FIG. 11C shows the subsequent command processing. When the requested computer receives the subsequent command before the completion of the antecedent IO request, the data is read from the logical volume 71 without mounting the logical volume 71 again because the logical volume 71 has already been mounted on the requested computer 20. Even when the antecedent IO request is completed, the logical volume 71 is not unmounted. The IO server 50 does not instruct the requested computer 20 to unmount the logical volume 71 until the completion of the subsequent IO request.

When a plurality of command processings targeting the same logical volume 71 as the access destination are requested to the same computer as shown in FIGS. 10, 11, the logical volume 71 only has to be mounted at the time of processing the first command and unmounted at the time of processing the last command. Therefore, the number of mountings and unmountings of the logical volume 71 can be reduced and the backlog can be reduced as well.

Figure 12:
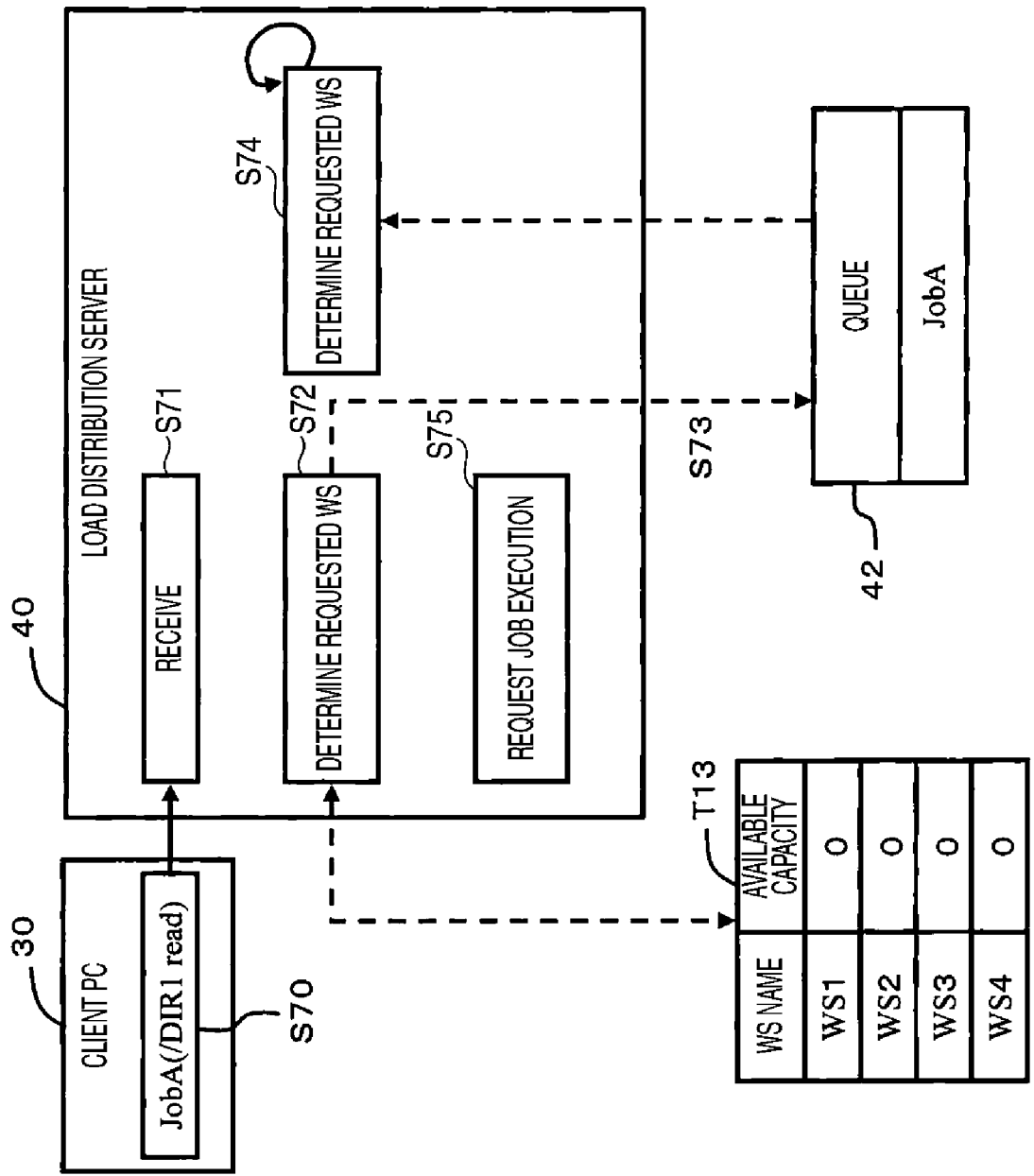
FIG. 12 is an explanatory diagram showing a flow of a load distribution server using a queue.

FIG. 12 shows the load distribution server 40 using the queue 42. The load distribution server 40 accepts the command "JobA/DIR1 read" issued from the client PC 30 (S70, S71). The load distribution server 40 uses the tables T11-T13 to select the requested computer from the computers 10, 20 in the computer system (S72).

However, the computers 10, 20, which are processing other jobs respectively, cannot process anew command. Accordingly, the load distribution server 40 stores the command having accepted in S71 in the queue 42 (S73). Then the load distribution server 40 tries to determine the requested computer regularly (S74). When the computer with available capacity is discovered, the load distribution server 40 selects the computer as the requested computer to be requested about the command processing registered in the queue (S75).

Figure 13:
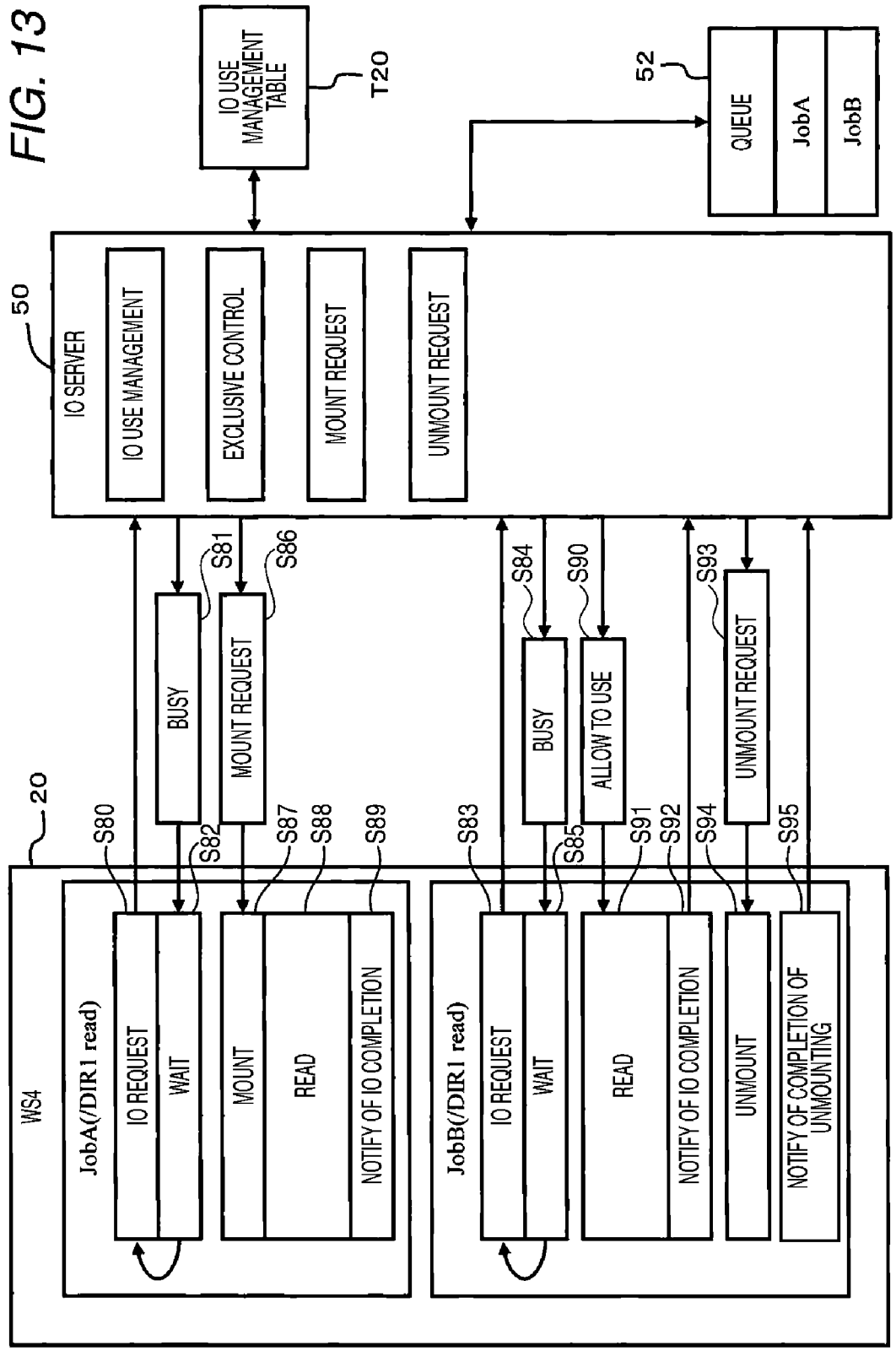
FIG. 13 is an explanatory diagram showing a flow of the IO server using the queue.
Figure 14:
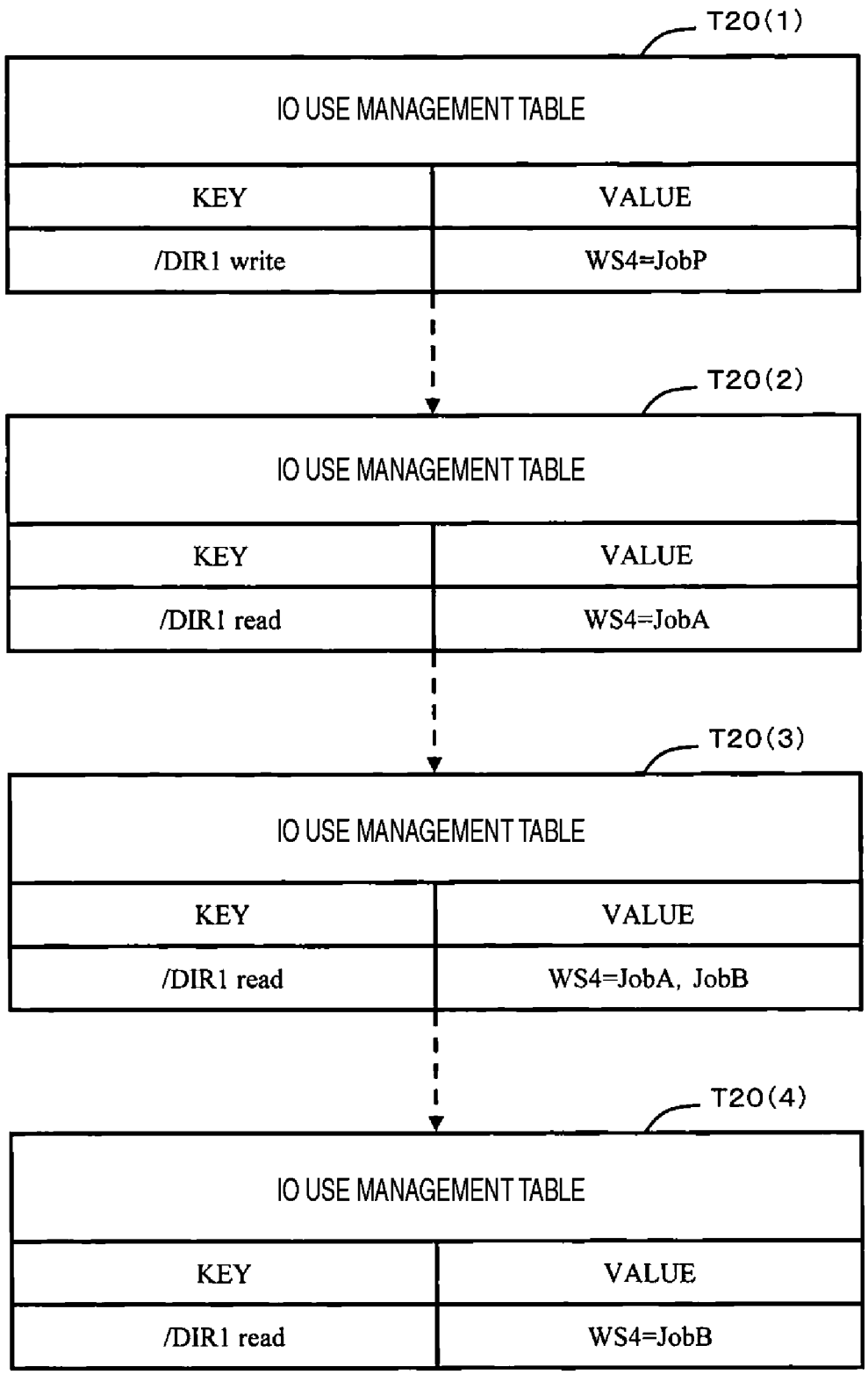
FIG. 14 is an explanatory diagram showing changes of an IO use management table.

FIGS. 13, 14 show the IO server using the queue 52. FIG. 14 shows the changes of the IO use management table T20. First of all, as shown in FIG. 14(1), it is assumed that the requested computer 20 (WS4) is writing the data in the logical volume 71 (JobP).

Then as shown in FIG. 13, it is assumed that the requested computer 20(WS4) is selected as the destination of processing of another command "JobA" and the requested computer 20(WS4) issues the IO request to the IO server 50 (S80). When the write request has already been issued with regard to the same logical volume 71, all subsequent IO requests are prohibited.

Consequently, the IO server 50 returns "BUSY" to the requested computer 20(WS4) (S81). The requested computer 20(WS4) waits for the passage of predetermined time (S82) to issue the IO request again (S80).

When the requested computer 20(WS4) is selected as the request destination for the processing of subsequent another command "JobB", the requested computer 20(WS4) requests about the access to the logical volume 71 (S83) similarly to the above, and the IO server 50 returns "BUSY" (S84). The requested computer 20(WS4) waits for the passage of predetermined time (S85) to issue the IO request again (S83).

The IO server 50 registers the commands "JobA" and "JobB" in the queue 52 and manages the commands. When the first write command "JobP" is completed, the write command "JobP" is deleted from the IO use management table T20. Thereby the IO server 50 requests the requested computer 20(WS4) to mount the logical volume 71 to get the next read command "JobA" to be performed (S86). The IO server 50 registers the execution of the read command "JobA" in the IO use management table T20 as shown in FIG. 14(2).

The requested computer 20(WS4) mounts the logical volume 71 (S87) to read the data from the logical volume 71 (S88). When the reading is completed, there is reported to the IO server 50 (S89).

Before the completion of "JobA" processing, the IO server 50 allows the requested computer 20(WS4) to use the logical volume 71 so as to make the requested computer 20(WS4) execute the subsequent read command "JobB" (S90). The requested computer 20(WS4) reads the data from the logical volume 71 that has already been mounted (S91) to notify the IO server 50 of the completion of processing (S92). The requested computer 20(WS4) unmounts the logical volume 71 (S94) to notify the IO server 50 of the completion of unmounting (S95).

A plurality of read requests about the same logical volume 71 can be performed at the same time as shown in FIG. 14(3). After the completion of the read command "JobA" started first, the description about "JobA" is deleted from the IO use management table T20 as shown in FIG. 14(4).

Figure 15:
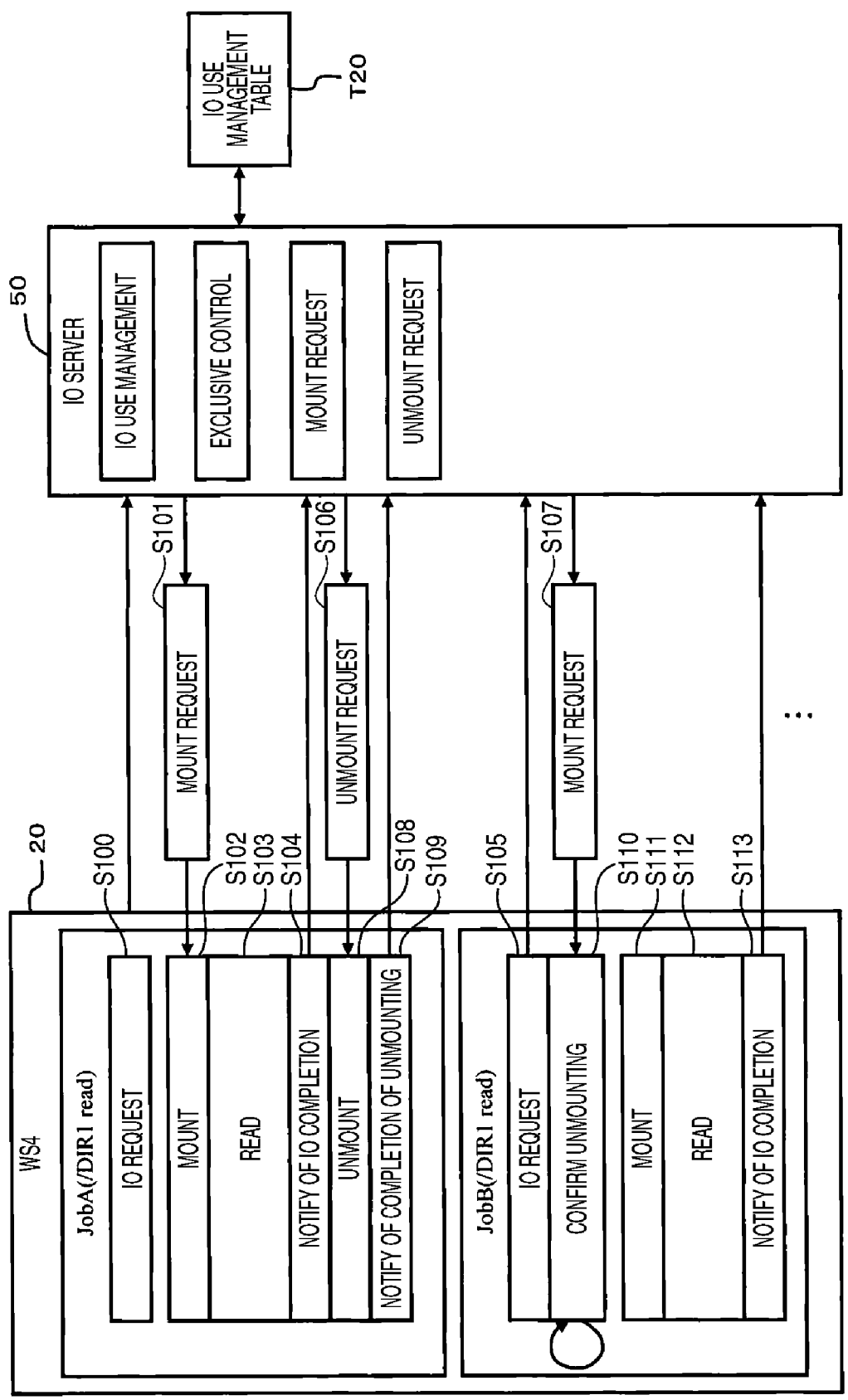
FIG. 15 is an explanatory diagram showing a mounting of the logical volume to be mounted after confirming an unmounting of the logical volume.
Figure 16:
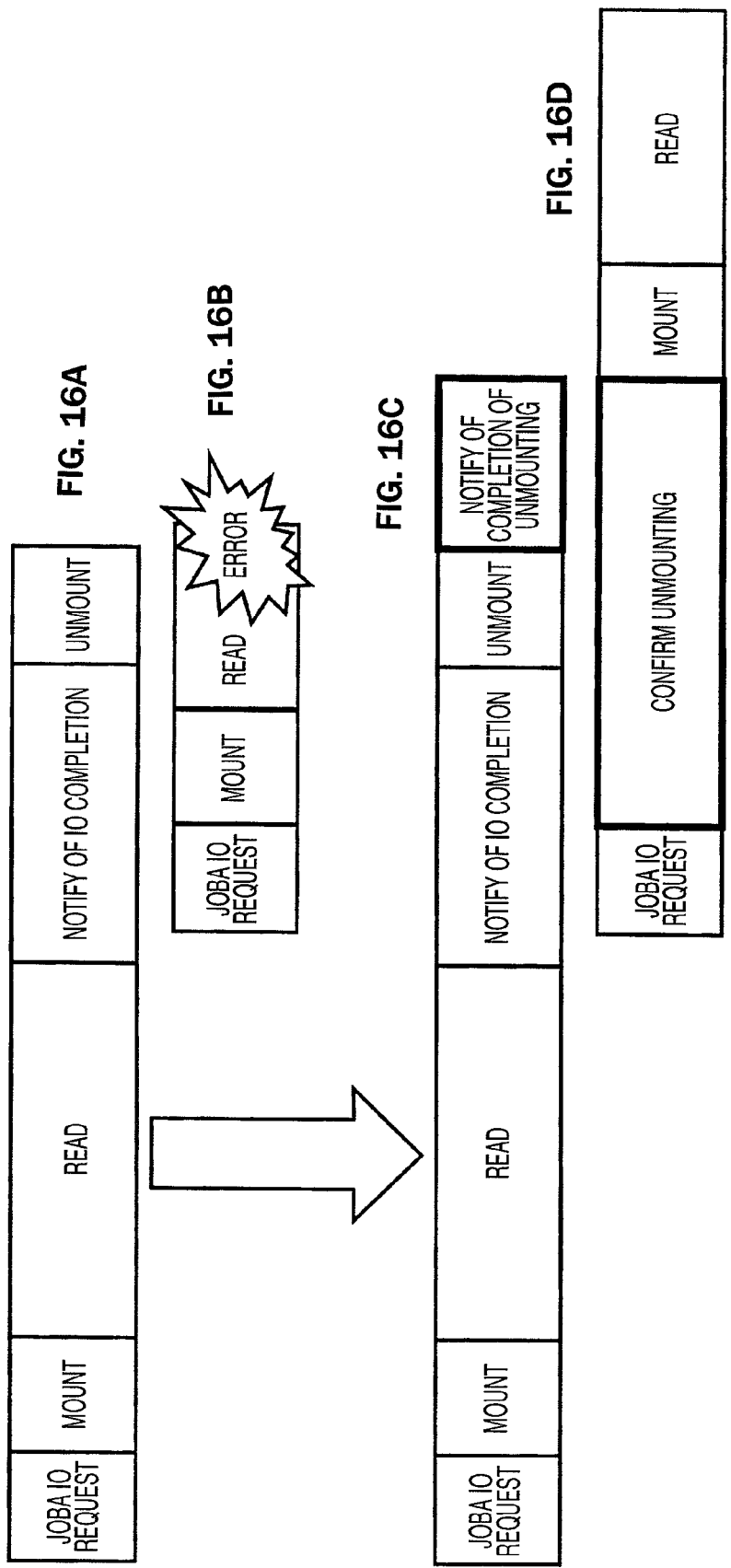
FIGS. 16A to FIG. 16D show a schematic timing chart until the mounting of the logical volume.

FIGS. 15, 16 show the method of improving reliability of mount control. As shown in FIG. 15, it is assumed that a plurality of commands (jobs) are performed in the same requested computer 20(WS4).

When the requested computer 20(WS4) requests the access to the logical volume 71 (S100), the IO server 50 refers to the IO use management table T20 to allow the requested computer 20(WS4) to mount the logical volume 71 (S101).

The requested computer 20(WS4) mounts the logical volume 71 (S102) to read the data from the logical volume 71 (S103) and to notify the IO server 50 of the completion of reading (S104). Thereby the IO server 50 requests the requested computer 20(WS4) to unmount the logical volume 71 (S106) and the requested computer 20(WS4) unmounts the logical volume 71 (S108). Then the requested computer 20(WS4) notifies the IO server 50 of the completion of unmounting (S109).

It is assumed that the requested computer 20(WS4) is selected as the requested computer for another command (JobB) targeting the same logical volume 71, after the completion of the processing of JobA. The requested computer 20(WS4) requests the IO server 50 about the access to the logical volume 71 (S105) and the IO server 50 allows the requested computer 20(WS4) to mount the logical volume 71 (S107).

The requested computer 20(WS4) confirms whether the logical volume 71 to be mounted has been unmounted or not (S110) instead of mounting the logical volume 71 immediately. As the confirmation method, for example, there can be exemplified a method where the requested computer 20(WS4) inquires of the IO server 50. The IO server 50 can refer to the IO use management table T20 to confirm the unmounting and notify the requested computer 20(WS4) of the result.

After confirming the unmounting of the logical volume 71, the requested computer 20(WS4) mounts the logical volume (S111) to read the data from the logical volume 71 (S112) and to notify the IO server 50 of the completion of the processing (S113).

FIGS. 16A and 16B show the case of mounting the logical volume 71 without confirming whether the unmounting state or not. When the subsequent read request "JobB" is requested to the requested computer 20(WS4) (FIG. 16B) after the completion of the antecedent read request "JobA" (FIG. 16A), the requested computer 20(WS4) mounts the logical volume 71. However as shown in FIG. 16A, the requested computer 20(WS4) unmounts the logical volume 71 as the completion of the antecedent read request. For this reason, an error occurs in the subsequent read request halfway as shown in FIG. 16B.

FIGS. 16C and 16D show the case of mounting after confirming the unmounting state. When the antecedent read request is completed as shown in FIG. 16C, the requested computer 20(WS4) notifies the IO server 50 of the completion of unmounting. Thereby the IO server 50 updates the description of the IO use management table T20. Then as shown in FIG. 16D, the requested computer 20(WS4) mounts the logical volume 71 after confirming the unmounting of the logical volume 71, for the processing of the subsequent read request.

Accordingly as shown in FIG. 15, mounting the logical volume 71 after confirming the unmounting of the logical volume 71 makes it possible to prevent the error from occurring due to the unmounting of the logical volume 71 during the IO request processing and to improve the quality of mount control. In the case of starting the processing of the subsequent IO request before the completion of the antecedent IO request, however, the subsequent IO request is executed without unmounting the logical volume 71 as described in FIGS. 10, 11.

There will be described the case where the second computers 20 supporting iSCSI mount the logical volume 71 on behalf of the first computers 10 not supporting iSCSI and provide the first computers 10 with the mounted logical volume 71 through NFS, in reference to FIGS. 17-20.

Figure 17:
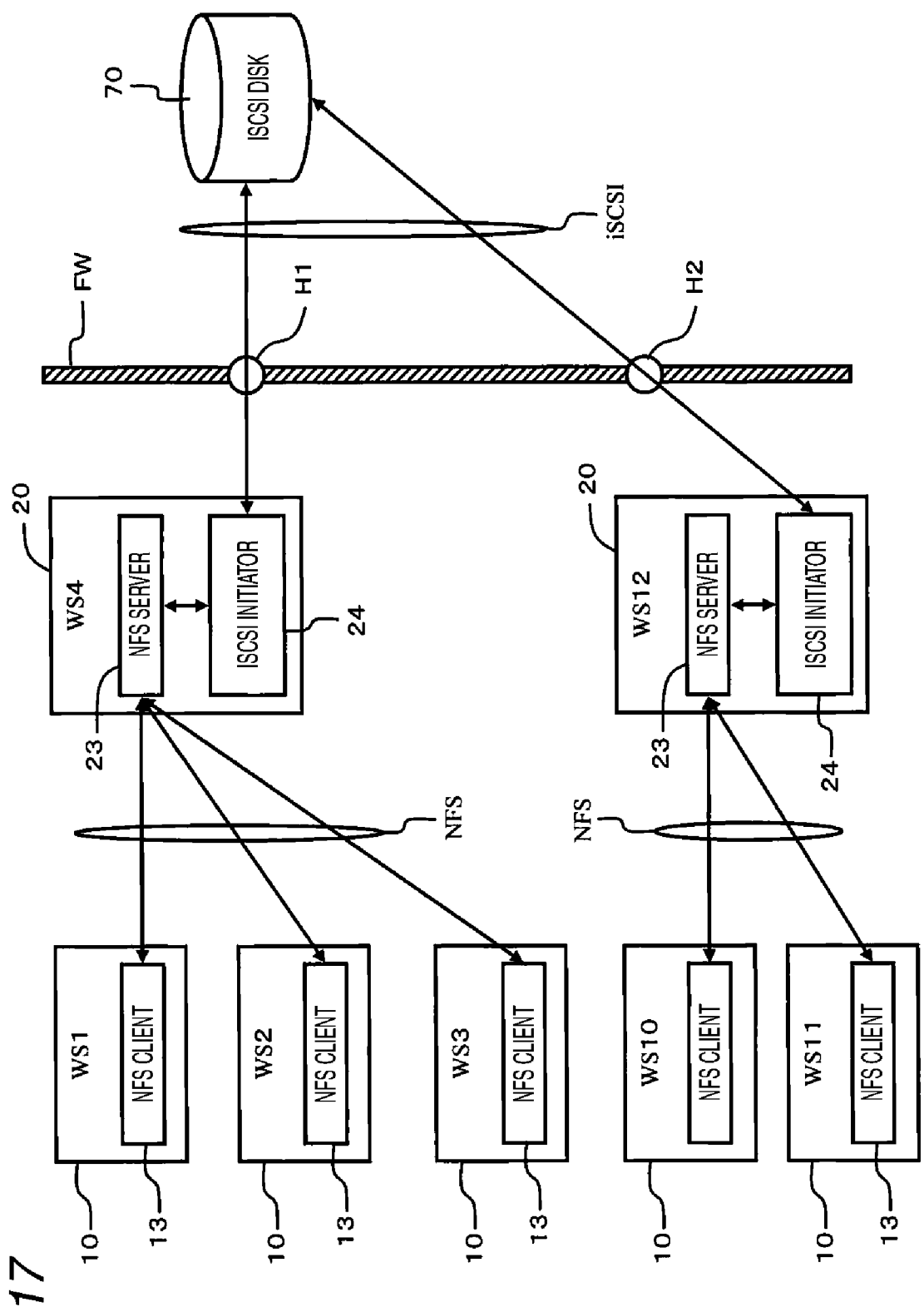
FIG. 17 is an explanatory diagram showing a computer in a fire wall using a shared disk outside the fire wall.

FIG. 17 is an explanatory diagram with the computer system viewed from another aspect. When the computers 10-60 and the shared disk 70 are located separately from each other, for example, a firewall FW is provided at the periphery of computers 10-60. In brief, the firewall FW allows only preset network ports H1, H2 to communicate externally.

Therefore, the second computers 20 having a function of direct access to the external shared disk 70 (iSCSI initiator 24) access the shared disk 70 through the pre-allowed network ports H1, H2. The first computers 10 without iSCSI initiator use the data in the shared disk 70 through the second computers 20 as the substitute computer and NFS.

Figure 18:
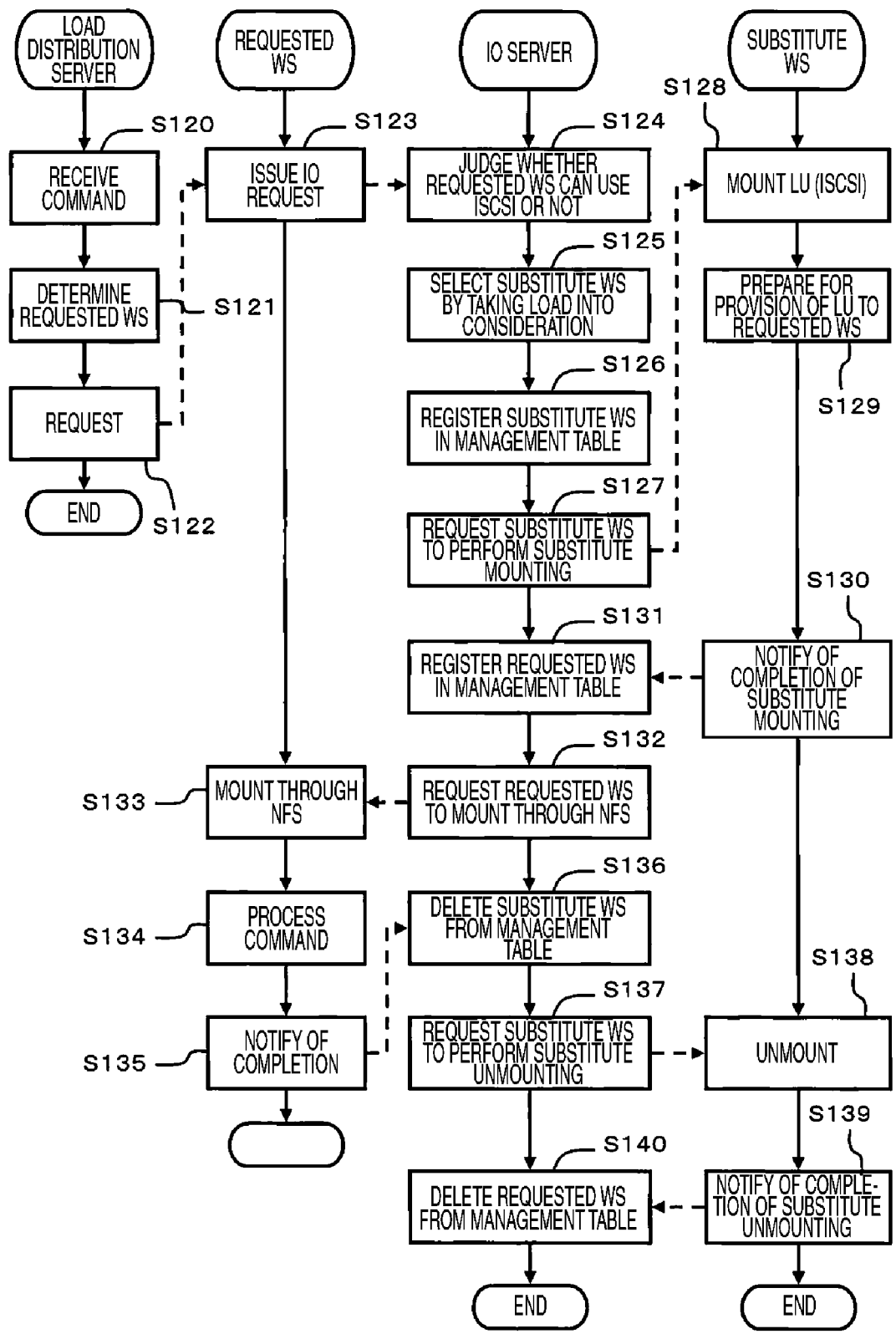
FIG. 18 is a flowchart showing a case of using a substitute computer.
Figure 19:
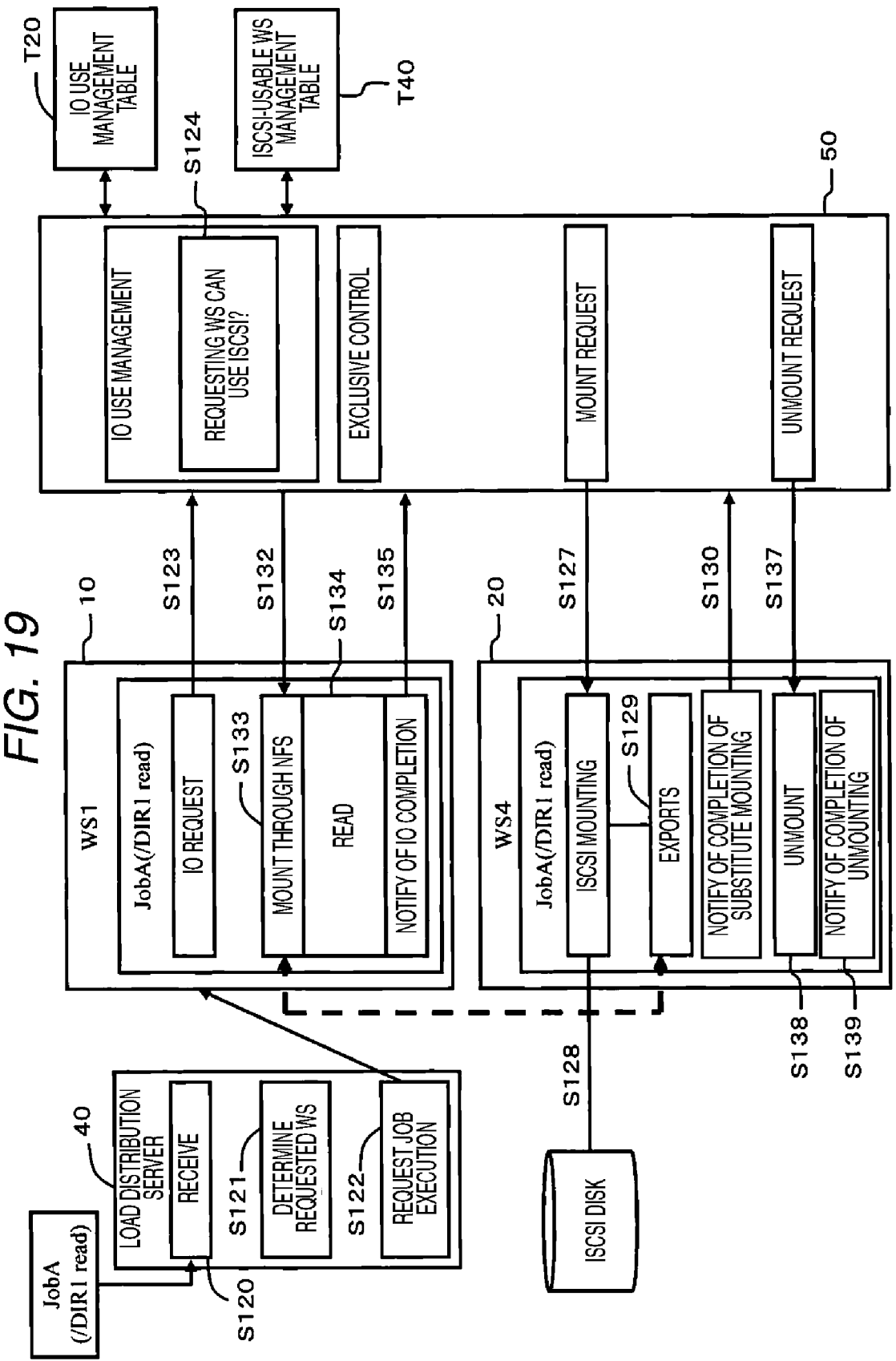
FIG. 19 is an explanatory diagram showing the case of using the substitute computer.
Figure 20:
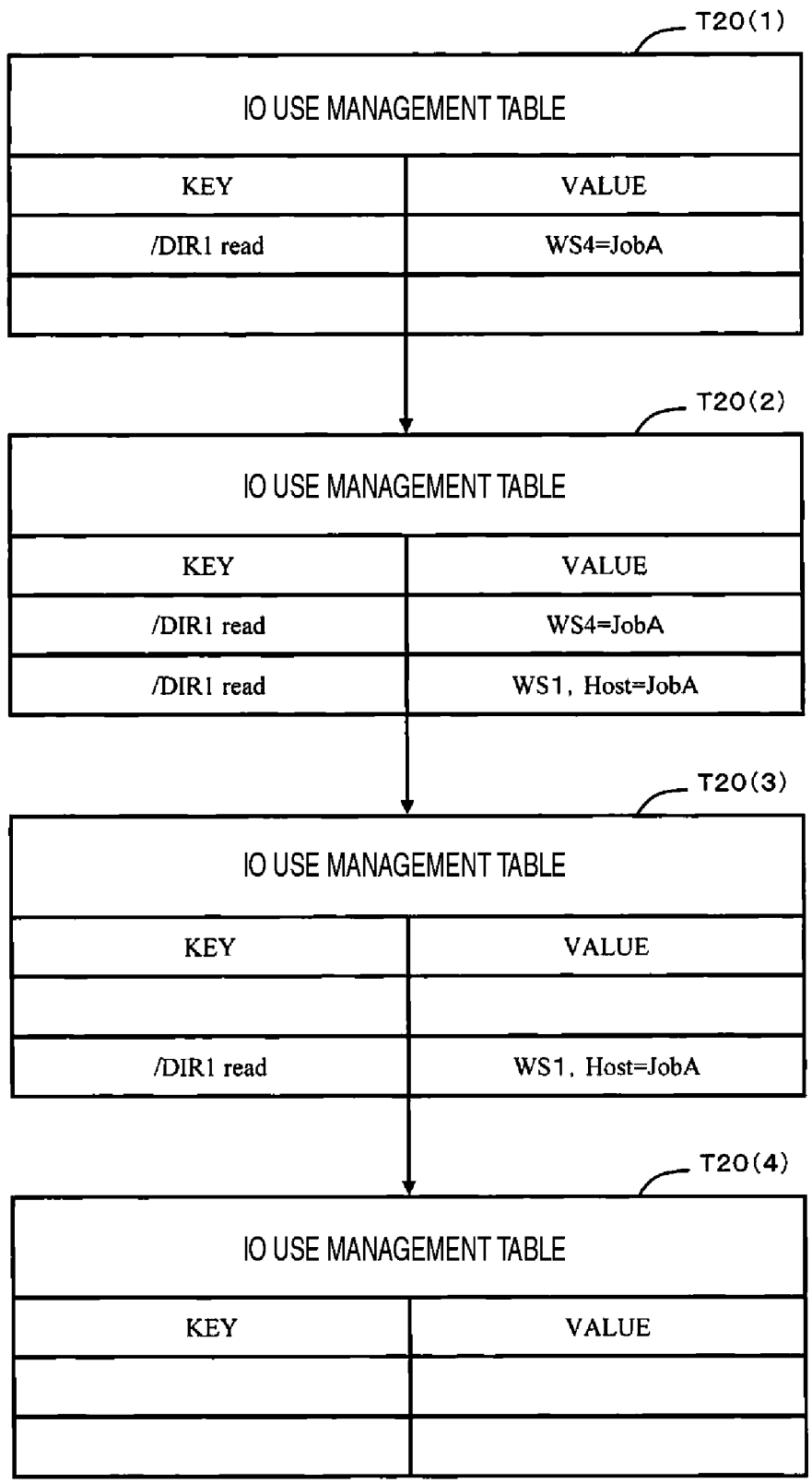
FIG. 20 is an explanatory diagram showing the changes of the IO use management table.

FIGS. 18, 19 show the processing where the first computers 10 not supporting iSCSI use the data in the logical volume 71 by using the substitute computer and NFS. FIG. 19 shows a part of steps in FIG. 18 in the name of understanding. FIG. 20 is an explanatory diagram showing the changes of the IO use management table T20.

In this Figure, one of the first computers 10 not supporting iSCSI (WS1) is selected as the requested computer while one of the second computers 20 supporting iSCSI (WS4) is selected as the substitute computer.

After receiving the command from the client PC 30 (S120), the load distribution server 40 determines the requested computer (S121) to request the requested computer to process the command (S122). Here, one of the first computers 10 not supporting iSCSI is selected as the requested computer 10 (WS1).

The requested computer 10 (WS1) requests the IO server 50 about the access to the logical volume 71 (S123). The IO server 50 refers to the iSCSI-usable computer management table T40 to judge whether the requested computer 10 (WS1) can use the iSCSI or not (S124).

Since the requested computer 10 (WS1) does not have the iSCSI initiator, the IO server 50 selects one of the second computers 20 as the substitute computer 20 (WS4) (S125). In other words, the IO server 50 selects the substitute computer 20 (WS4) by taking a load distribution into consideration so as to prevent the function of the substitute computer from concentrating on the specific second computer 20.

The IO server 50 registers the information on the substitute computer 20 (WS4) in the IO use management table T20 as shown in FIG. 20(1) (S126). As shown in FIG. 20(1), the information indicating which logical volume 71 is requested about IO request and what type of IO request is issued (DIR1 read) and the information indicating which computer executes the IO (WS4=JobA) are registered in the IO use management table T20.

Then the IO server 50 requests the substitute computer 20 (WS4) to mount the logical volume 71 in the shared disk 70 (S127). This request can be called a substitute mount request.

The substitute computer 20 (WS4) mounts the logical volume 71 in response to the request from the IO server 50 (S128) to set an NFS server (S129). In other words, the substitute computer 20 (WS4) specifies the logical volume 71 and the requested computer 10 (WS1) to set the NFS server 23. Only the requested computer 10 (WS1) preset in the NFS server 23 can share the preset logical volume 71.

The substitute computer 20 (WS4) notifies the IO server 50 of the completion of mounting the logical volume 71 (S130). The IO server 50 registers the requested computer 10 (WS1) in the IO use management table T20 as shown in FIG. 20(2) as "/DIR1 read", "WS1, Host=JobA" (S131). Then the IO server 40 requests the requested computer 10 (WS1) to mount the logical volume 71 through NFS (S132).

The requested computer 10 (WS1) mounts the logical volume 71 through the NFS client 13 and the NFS server 23 (S133). The requested computer 10 (WS1) processes the command (S134) to notify the IO server 50 of the completion of the processing (S135).

As shown in FIG. 20(3), the IO server 50 deletes the description on the substitute computer 20 (WS4) from the IO use management table T20 (S136) to request the substitute computer 20 (WS4) to unmount the logical volume 71 (S137). The unmounting of the logical volume 71 mounted on behalf of other computers can be called a substitute unmount.

The substitute computer 20 (WS4) unmounts the logical volume 71 (S138) to notify the IO server 50 of the completion of unmounting (S139). The IO server 50 deletes the information on the requested computer 10 (WS1) from the IO use management table T20 as shown in FIG. 20(4) (S140).

According to this embodiment thus configured, the plurality of computers 10, 20 can share the same logical volume 71 in the shared disk 70. In this embodiment, when the read access is previously performed about the logical volume 71 in the case of issuing a plurality of IO requests about the same logical volume 71 from different computers, both the write access and the read access can performed thereafter for the logical volume 71. Therefore, the chance of using the same logical volume 71 by the plurality of computers 10, 20 in the computer system at the same time increases to reduce a backlog and to improve usability.

In this embodiment, one of the computers 10, 20 is selected as the requested computer so that a load can be distributed in the computers and the requested computer receives the request about the command processing. Therefore, the requested computer is determined according to the load status in the computers 10, 20 to reduce the backlog.

Also in this embodiment, the computers 10 not supporting iSCSI can use the data in the desired logical volume 71 through the computers 20 supporting iSCSI and NFS under the system environment where the computers 10 not supporting iSCSI and the computers 20 supporting iSCSI exist at the same time. Consequently, it is not necessary to provide an iSCSI initiator function in all computers in the computer system to reduce the construction cost and maintenance cost in the system. In addition, limiting the number of the computers 20 supporting iSCSI makes it possible to limit the configuration number of ports H1, H2 passing through the fire wall FW to improve security. The more the number of ports allowing the communication becomes, the more the possibility of unauthorized outgoing access becomes and the more trouble of managing the firewall FW becomes as well.

In this embodiment, the substitute computer is selected so that a load can be distributed in one of the second computers 20 supporting iSCSI. In other words, a specific second computer 20 is selected as the substitute computer to prevent a high-load status and to reduce the backlog.

In this embodiment, the iSCSI initiator can be realized by any of hardware circuits and software products. In an iSCSI initiator of software product, the resource such as memory and computational capacity in computer is consumed. So that the IO server 50 can select a substitute computer in running the software products of iSCSI initiator on the computer, taking the resource consumption into consideration.

Second Embodiment

The second embodiment will be described in reference to FIGS. 21, 22. Since this embodiment corresponds to the modification of the first embodiment, the description overlapping with the first embodiment will be omitted and there will be described centering on the characteristics in this embodiment.

In this embodiment, the summary of the case of applying to a circuit design system using VHDL (Very high-speed integrated circuit Hard-ware Description Language) will be described. The client PC 30 requests, for example, one VHDL compile and three VHDL simulations.

In the VHDL compile, the compiled code is written in the logical volume 71 in the shared disk 70 while in the VHDL simulation the compiled code is read from the logical volume 71 to be simulated. In this embodiment, one write request is issued for the VHDL compile (S200) and then read requests are issued for each of the three VHDL simulations (S200).

The load distribution server 40 acquires the remaining mounting capacity from the IO server 50 (S201), multiplies the remaining computational capacity by the remaining mounting capacity and calculates the available capacities of the computers (S202). The load distribution server 40 selects the computer with the largest available capacity in the computers as the requested computer 20 (WS23) to be requested about the processing of the write request (JobA) (S204). The load distribution server 40 rewrites the item of the remaining computational capacity and the item of the current execution number in the computing capacity management table T11

(S203). Then the load distribution server 40 requests the requested computer 20 (WS23) to process the write command (S204).

The requested computer 20 (WS23) requests the IO server 50 to access the logical volume 71 (S205). The IO server 50 requests the requested computer 20 (WS23) to mount the logical volume 71 (S206). In this example, since the first IO request to the logical volume 71 is the write command received in S200, the previously-executed IO request does not exist. Therefore, the requested computer 20 (WS23) is allowed to mount the logical volume 71.

The requested computer 20 (WS23) mounts the logical volume 71 in the shared disk 70 (S207), writes the compiled code in the logical volume 71 (S208) and notifies the IO server 50 of the completion of writing (S209).

When the IO server 50 requests the requested computer 20 (WS23) to unmount (S210), the requested computer 20 (WS23) unmounts the logical volume 71 (S212). Note that the IO server 50 updates the item of the remaining mounting capacity and the item of the current mounting number in the iSCSI-IO use status management table T12 (S211).

The requested computer 20 (WS23) notifies the load distribution server 40 of the completion of processing (S213). Based on this notification, the load distribution server 40 updates the item of the remaining computational capacity and the item of the current execution number in the computing capacity management table T11.

In this embodiment as described above, the first write request is processed by the requested computer 20 (WS23). Also in this embodiment, the first read request (JobB) is requested to the same computer 20 (WS23) as the computer having processed the write request among the three read requests following the write request, because of the available capacities in the computers. The second read request (JobC) is requested to another computer 20 (WS21) with the second largest available capacity after the computer 20 (WS23) and the last read request (JobD) is requested to still another computer 20 (WS22).

Figure 22:
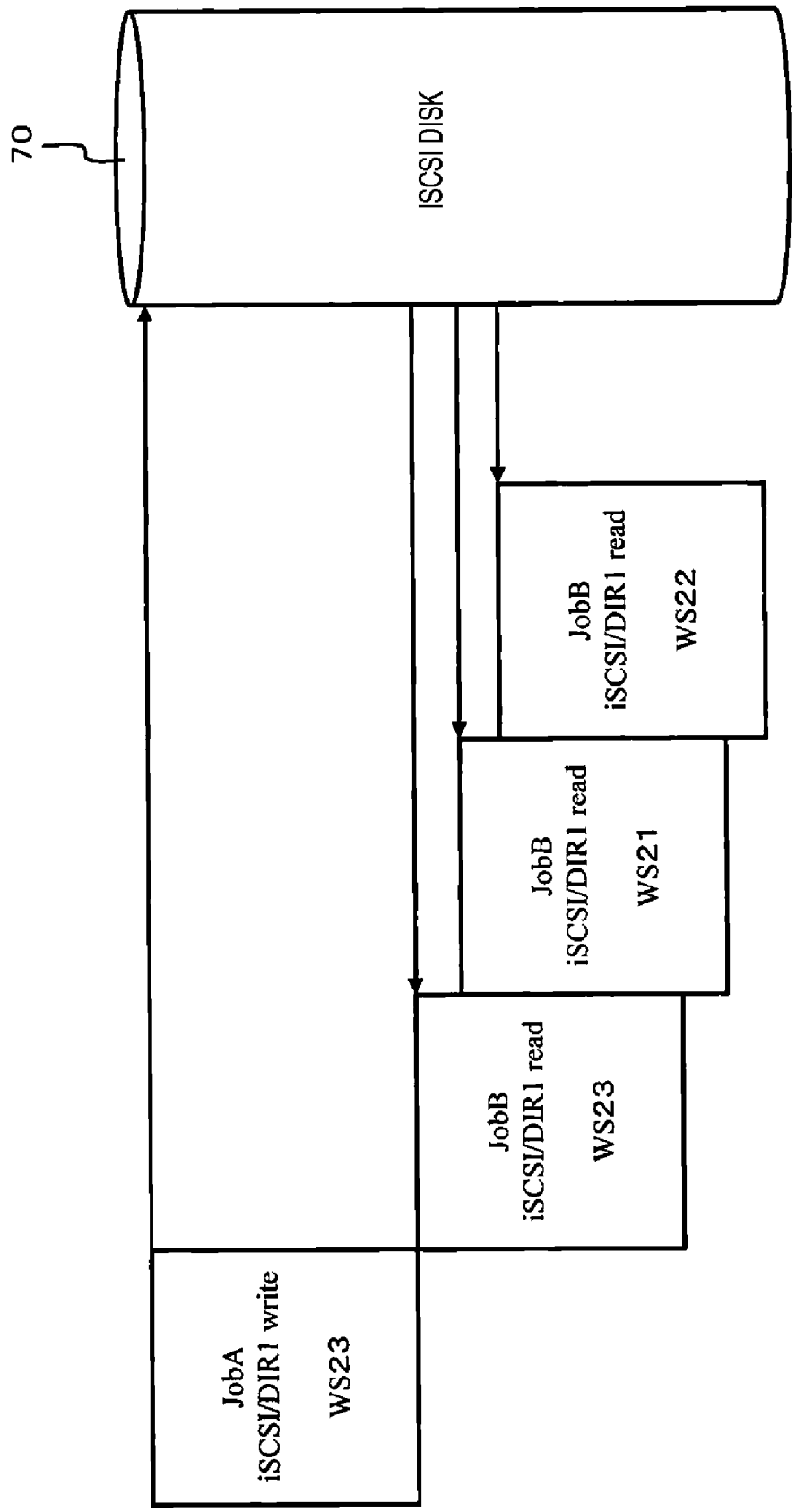
FIG. 22 is an explanatory diagram showing a transaction in the case where a plurality of IO requests use the same logical volume.

FIG. 22 is a diagram showing a frame format of the transaction on the logical volume 71 in the shared disk 70. The write request is executed by the requested computer 20 (WS23). Since the IO request to the same logical volume 71 is prohibited during write request execution, the three read requests are stored in the queue 52 in the IO server 50.

After the completion of the execution of the write request, each read request is executed in the order of being stored in the queue 52. Each read request is executed in parallel and the data is read from the logical volume 71 at the same time. Or, the queue 52 may be eliminated and the IO request on standby may be executed irrespective of the order of issuance thereof. The same effect as in the first embodiment can be obtained according to this embodiment thus configured.

It should be noted that the invention is not restricted to the above-described embodiments. A person skilled in the art can carry out various additions and modifications within the scope of the invention.

What is claimed is:

1. A computer system comprising:
   at least one shared storage device connected to a communication network and utilized based on iSCSI (internet Small Computer System Interface);
   a plurality of computers each connected to the shared storage device through the communication network;
   a load distribution control part that selects one of the computers as a requested computer to be requested about command processing to distribute the load in the computers; and
   an access request control part that judges an acceptance of an access request issued by the requested computer for the command processing and allows an access to the shared storage device by the requested computer only when the access request is accepted,
   wherein the access request control part judges the acceptance of a plurality of access requests respectively issued by different and a plurality of the requested computers to allow each of the requested computers to use the shared storage device by using iSCSI at the same time,
   wherein a plurality of first computers included in the computers are not provided with an iSCSI initiator to access the shared storage device directly while a plurality of second computers other than the first computers among the computers are provided with the iSCSI initiator, and further the first and second computers are provided with a network file system respectively to share a file system through the communication network, wherein when the requested computer is selected from the first computers by the load distribution control part the access request control part selects a substitute computer from the second computers to access the shared storage device on behalf of the first computer selected as the requested computer, and wherein the first computer selected as the requested computer uses the network file system to utilize data in the shared storage device mounted on the second computer selected as the substitute computer, and
   wherein the substitute computer can generate an NFS (Network File System) server while the requested computer can generate an NFS client.

2. The computer system according to claim 1, wherein when an antecedent access request issued first and a subsequent access request issued subsequently are issued from different requested computers the access request control part allows both a read access and a write access with regard to the subsequent access request only in the case of the antecedent access request being the read access while the access request control part prohibits both the read access and the write access with regard to the subsequent access request in the case of the antecedent access request being the write access.

3. The computer system according to claim 1, wherein the access request control part selects the substitute computer so that the load is distributed in the second computers.

4. The computer system according to any one of claim 1, 2 or 3, wherein the computer to mount the shared storage device among the computers mounts the shared storage device after confirming the shared storage device is unmounted.

5. The computer system according to claim 4, wherein the computer to mount the shared storage device does not mount the shared storage device again when the shared storage device has already been mounted on an own computer.

6. The computer system according to claim 5, wherein the computer to mount the shared storage device unmounts the shared storage device after the completion of the command processing to notify the access request control part of the unmounting.

7. The computer system according to claim 5, wherein the load distribution control part selects one of the computers as the requested computer to be requested about command processing so that a waiting time for the command processing can be the shortest.

8. The computer system according to claim 4, wherein the computer to mount the shared storage device unmounts the shared storage device after the completion of the command processing to notify the access request control part of the unmounting.

9. The computer system according to claim 8, wherein the load distribution control part selects one of the computers as the requested computer to be requested about command processing so that a waiting time for the command processing can be the shortest.

10. The computer system according to claim 4, wherein the load distribution control part selects one of the computers as the requested computer to be requested about command processing so that a waiting time for the command processing can be the shortest.

11. The computer system according to any one of claims 1,2 or 3, wherein the load distribution control part selects one of the computers as the requested computer to be requested about command processing so that a waiting time for the command processing can be the shortest.

12. A computer system comprising:
   at least one shared storage device connected to a communication network based on iSCSI;
   a plurality of first computers, each not provided with an iSCSI initiator, and each connected to the shared storage device through the communication network;
   a plurality of second computers, each provided with an iSCSI initiator, and each connected to the shared storage device through the communication network;
   a load distribution control part that selects one of the computers from the first and second computers as a requested computer to be requested about a processing of command received from a client computer to distribute the load in all computers of the first and second computers; and
   an access request control part that judges an acceptance of an access request to the shared storage device issued by the requested computer for the processing of command and allows an access to the shared storage device by the requested computer only when the access request is accepted,
   wherein the first computers can generate an NFS client to utilize the shared storage device through a predetermined second computer from the second computers,
   wherein the second computers generate an NFS server to provide the shared storage device to the NFS client included in a predetermined first computer from the first computers and are provided with an iSCSI initiator to access the shared storage device, and
   wherein when the predetermined first computer is selected as the requested computer from the first computers the access request control part selects the predetermined second computer as a substitute computer from the second computers and controls the data in the shared storage device to be provided to the NFS client in the predetermined first computer selected as the requested computer through the NFS server in the predetermined second computer selected as the substitute computer.

13. The computer system according to claim 12, wherein the access request control part selects the substitute computer so that the load is distributed in the second computers.

14. The computer system according to claim 12 or 13, wherein: when an antecedent access request issued first and a subsequent access request issued subsequently are issued from the same requested computer the access request control part allows only a read access with regard to the subsequent access request; and when the antecedent access request and the subsequent access request are issued from different requested computers the access request control part allows only a read access with regard to the antecedent access request and allows both the read access and the write access with regard to the subsequent access request.

* * * * *